US012063649B2

(12) United States Patent
Lee et al.

(10) Patent No.: US 12,063,649 B2
(45) Date of Patent: *Aug. 13, 2024

(54) SYSTEM AND METHOD FOR BANDWIDTH PART OPERATION

(71) Applicant: InterDigital Patent Holdings, Inc., Wilmington, DE (US)

(72) Inventors: Moon-il Lee, Melville, NY (US); Janet A. Stern-Berkowitz, Little Neck, NY (US); Virgil Comsa, Montreal (CA)

(73) Assignee: InterDigital Patent Holdings, Inc., Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/363,467

(22) Filed: Aug. 1, 2023

(65) Prior Publication Data
US 2023/0379910 A1  Nov. 23, 2023

Related U.S. Application Data

(63) Continuation of application No. 16/971,800, filed as application No. PCT/US2019/019174 on Feb. 22, 2019, now Pat. No. 11,765,720.
(Continued)

(51) Int. Cl.
*H04W 72/1273* (2023.01)
*H04W 24/10* (2009.01)
(Continued)

(52) U.S. Cl.
CPC ....... *H04W 72/1273* (2013.01); *H04W 24/10* (2013.01); *H04W 72/0453* (2013.01);
(Continued)

(58) Field of Classification Search
CPC ............. H04W 72/1273; H04W 24/10; H04W 72/0453; H04W 72/0446; H04W 72/23;
(Continued)

(56) References Cited

U.S. PATENT DOCUMENTS 10,785,759 B2    9/2020  Lin et al.
2017/0223738 A1  8/2017  Seo et al.
(Continued)

FOREIGN PATENT DOCUMENTS

CN    106664729 A    5/2017
CN    107210801 A    9/2017
(Continued)

OTHER PUBLICATIONS

3rd Generation Partnership Project (3GPP), "Details of BWP switching operation", R1-1720556, InterDigital, Inc., 3GPP TSG RAN WG1 Meeting #91, Nov. 27-Dec. 1, 2017, Reno, U.S., 4 pages.
(Continued)

*Primary Examiner* — Faruk Hamza
*Assistant Examiner* — Aixa A Guadalupe Cruz
(74) *Attorney, Agent, or Firm* — Flaster Greenberg, P.C.

(57) ABSTRACT

Methods and systems are described herein for bandwidth part (BWP) operation in 5G wireless systems. A wireless transmit/receive unit (WTRU) may be configured to receive a physical downlink control channel (PDCCH) transmission on a first BWP associated with a first carrier. The PDCCH transmission may include scheduling information for receiving a physical shared downlink channel (PDSCH) transmission via a second BWP associated with a second carrier. The WTRU may be configured to determine one or more quasi co-located (QCL) parameters for the PDSCH transmission using a lowest transmission configuration indication (TCI) state associated with the second BWP associated with the second carrier based on a scheduling offset of the PDSCH transmission being less than a threshold and on the PDSCH transmission being received via the second BWP. The WTRU may be configured to receive the PDSCH transmission using the determined one or more QCL parameters.

18 Claims, 13 Drawing Sheets

Related U.S. Application Data

(60) Provisional application No. 62/652,827, filed on Apr. 4, 2018, provisional application No. 62/634,601, filed on Feb. 23, 2018.

(51) Int. Cl.
*H04W 72/0453* (2023.01)
*H04W 72/23* (2023.01)
*H04L 5/00* (2006.01)
*H04W 72/0446* (2023.01)

(52) U.S. Cl.
CPC .......... *H04L 5/0053* (2013.01); *H04L 5/0094* (2013.01); *H04W 72/0446* (2013.01); *H04W 72/23* (2023.01)

(58) Field of Classification Search
CPC ..... H04L 5/0053; H04L 5/0094; H04L 5/005; H04L 5/001; H04L 5/0007; H04L 5/0028; H04L 5/00; H04B 7/0626
See application file for complete search history.

(56) References Cited

U.S. PATENT DOCUMENTS

| | | | |
|---|---|---|---|
| 2018/0034525 | A1 | 2/2018 | Park et al. |
| 2018/0049047 | A1 | 2/2018 | Lin et al. |
| 2018/0343653 | A1* | 11/2018 | Guo .................... H04W 72/046 |
| 2019/0116582 | A1 | 4/2019 | Pelletier et al. |
| 2019/0174466 | A1 | 6/2019 | Zhang et al. |
| 2019/0261405 | A1 | 8/2019 | Ang et al. |
| 2020/0288479 | A1 | 9/2020 | Xi et al. |
| 2021/0051667 | A1* | 2/2021 | Yang .................... H04W 72/56 |

FOREIGN PATENT DOCUMENTS

| | | |
|---|---|---|
| RU | 2643660 C1 | 2/2018 |
| TW | 201806425 A | 2/2016 |
| TW | 201737679 A | 10/2017 |
| WO | WO 2017/173033 A1 | 10/2017 |

OTHER PUBLICATIONS

3rd Generation Partnership Project (3GPP), "Details on configuration of presence of TCI in DCI", R1-1720308, Samsung, 3GPP TSG RAN WG1 Meeting 91, Nov. 27-Dec. 1, 2017, Reno, US, 4 pages.
3rd Generation Partnership Project (3GPP), "On timing between DCI indicating active BWP switching and active BWP switching", R1-1720338, 3GPP TSG RAN WG1 Meeting 91, Nov. 27-Dec. 1, 2017, Reno, US, 4 pages.
3rd Generation Partnership Project (3GPP), "Open Issues on BWP", R1-1720693, Qualcomm Incorporated, 3GPP TSG RAN WG1 #91, Nov. 27-Dec. 1, 2017, Reno, US, 15 pages.
IEEE Standard for Information technology—Telecommunications and information exchange between systems—Local and metropolitan area networks—Specific requirements; Part 11: Wireless LAN Medium Access Control (MAC) and Physical Layer (PHY) Specifications, IEEE Std. 802.11-2016 (Dec. 7, 2016).
IEEE Standard for Information technology—Telecommunications and information exchange between systems—Local and metropolitan area networks—Specific requirements; Part 11: Wireless LAN Medium Access Control (MAC) and Physical Layer (PHY) Specifications; Amendment 4: Enhancements for Very High Throughput for Operation in Bands below 6GHZ, IEEE Std 802.11ac-2013 (Dec. 11, 2013).
IEEE Standard for Information Technology—Telecommunications and information exchange between systems—Local and metropolitan area networks—Specific requirements; Part 11: Wireless LAN Medium Access Control (MAC) and Physical Layer (PHY) specifications; Amendment 5: Television White Spaces (TVWS) Operation, IEEE 802.11af-2013 (Dec. 11, 2013).
IEEE Standard for Information technology—Telecommunications and information exchange between systems—Local and metropolitan area networks—Specific requirements; Part 11: Wireless LAN Medium Access Control (MAC) and Physical Layer (PHY) Specifications; Amendment 5: Enhancements for Higher Throughput, IEEE Std 802.11n-2009 (Sep. 2009).
IEEE Standard for Information technology—Telecommunications and information exchange between systems Local and metropolitan area networks—Specific requirements; Part 11: Wireless LAN Medium Access Control (MAC) and Physical Layer (PHY) Specifications; Amendment 2: Sub 1 GHz License Exempt Operation, IEEE 802.11ah-2016 (Dec. 7, 2016).
Intel Corporation, "Remaining details for bandwidth parts," 3GPP TSG RAN WG1 Meeting 91, R1-1720100, Reno, USA (Nov. 27-Dec. 1, 2017).
Interdigital, Inc., "Details of BWP switching operation," 3GPP TSG RAN WG1 Meeting AH1801, R1-1800603, Vancouver, Canada (Jan. 22-26, 2018).
LG Electronics, "Discussion on carrier aggregation and bandwidth parts," 3GPP TSG RAN WG1 Meeting NR#3, R1-1715892, Nagoya, Japan (Sep. 18-21, 2017).
Third Generation Partnership Project, "Technical Specification Group Radio Access Network; Evolved Universal Terrestrial Radio Access (E-UTRA); Physical Channels and Modulation (Release 11)," 3GPP TS 36.211 V11.4.0 (Sep. 2013).
Third Generation Partnership Project, "Technical Specification Group Radio Access Network; Evolved Universal Terrestrial Radio Access (E-UTRA); Physical channels and modulation (Release 15)," 3GPP TS 36.211 V15.0.0 (Dec. 2017).
Third Generation Partnership Project, "Technical Specification Group Radio Access Network; Evolved Universal Terrestrial Radio Access (E-UTRA); Multiplexing and channel coding (Release 11)," 3GPP TS 36.212 V11.3.0 (Jun. 2013).
Third Generation Partnership Project, "Technical Specification Group Radio Access Network; Evolved Universal Terrestrial Radio Access (E-UTRA); Multiplexing and channel coding (Release 15)," 3GPP TS 36.212 V15.0.1 (Jan. 2018).
Third Generation Partnership Project, "Technical Specification Group Radio Access Network; Evolved Universal Terrestrial Radio Access (E-UTRA); Physical layer procedures (Release 11)," 3GPP TS 36.213 V11.4.0 (Sep. 2013).
Third Generation Partnership Project, "Technical Specification Group Radio Access Network; Evolved Universal Terrestrial Radio Access (E-UTRA); Physical layer procedures (Release 15)," 3GPP TS 36.213 V15.0.0 (Dec. 2017).
Third Generation Partnership Project, "Technical Specification Group Radio Access Network; Evolved Universal Terrestrial Radio Access (E-UTRA); Radio Resource Control (RRC); Protocol specification (Release 11)," 3GPP TS 36.331 V11.4.0 (Jun. 2013).
Third Generation Partnership Project, "Technical Specification Group Radio Access Network; Evolved Universal Terrestrial Radio Access (E-UTRA); Radio Resource Control (RRC); Protocol specification (Release 15)," 3GPP TS 36.331 V15.0.1 (Jan. 2018).
Third Generation Partnership Project, "Technical Specification Group Radio Access Network; NR; Physical layer procedures for data (Release 15)," 3GPP TS 38.214 V15.0.0 (Dec. 2017).
Third Generation Partnership Project, "Technical Specification Group Radio Access Network; NR; Multiplexing and channel coding (Release 15)," 3GPP TS 38.212 V15.0.0 (Dec. 2017).
Third Generation Partnership Project, "Technical Specification Group Radio Access Network; NR; Physical layer procedures for control (Release 15)," 3GPP TS 38.213 V15.0.0 (Dec. 2017).
Third Generation Partnership Project, "Technical Specification Group Radio Access Network; NR; Physical layer procedures for control (Release 15)," 3GPP TS 38.213 V15.4.0 (Dec. 2018).
Third Generation Partnership Project, "Technical Specification Group Radio Access Network; NR; Multiplexing and channel coding (Release 15)," 3GPP TS 38.212 V15.4.0 (Dec. 2018).
Third Generation Partnership Project, "Technical Specification Group Radio Access Network; NR; NR and NG-RAN Overall Description; Stage 2 (Release 15)," 3GPP TS 38.300 V15.0.0 (Dec. 2017).

(56) References Cited

OTHER PUBLICATIONS

Third Generation Partnership Project, "Technical Specification Group Radio Access Network; NR; NR and NG-RAN Overall Description; Stage 2 (Release 15)," 3GPP TS 38.300 V15.4.0 (Dec. 2018).
Third Generation Partnership Project, "Technical Specification Group Radio Access Network; NR; Physical layer procedures for data (Release 15)," 3GPP TS 38.214 V15.4.0 (Dec. 2018).
Third Generation Partnership Project, "Technical Specification Group Radio Access Network; Evolved Universal Terrestrial Radio Access (E-UTRA); Radio Resource Control (RRC); Protocol specification (Release 15)," 3GPP TS 36.331 V15.4.0 (Dec. 2018).
Third Generation Partnership Project, "Technical Specification Group Radio Access Network; Evolved Universal Terrestrial Radio Access (E-UTRA); Physical channels and modulation (Release 15)," 3GPP TS 36.211 V15.4.0 (Dec. 2018).
Third Generation Partnership Project, "Technical Specification Group Radio Access Network; Evolved Universal Terrestrial Radio Access (E-UTRA); Multiplexing and channel coding (Release 15)," 3GPP TS 36.212 V15.4.0 (Dec. 2018).
Third Generation Partnership Project, "Technical Specification Group Radio Access Network; Evolved Universal Terrestrial Radio Access (E-UTRA); Physical layer procedures (Release 15)," 3GPP TS 36.213 V15.4.0 (Dec. 2018).
Third Generation Partnership Project, "Technical Specification Group Radio Access Network; Evolved Universal Terrestrial Radio Access (E-UTRA); User Equipment (UE) procedures in idle mode (Release 12)," 3GPP TS 36.304 V12.1.0 (Jun. 2014).
Third Generation Partnership Project, "Technical Specification Group Radio Access Network; Evolved Universal Terrestrial Radio Access (E-UTRA); User Equipment (UE) procedures in idle mode (Release 14)," 3GPP TS 36.304 V14.5.0 (Dec. 2017).
Third Generation Partnership Project, "Technical Specification Group Radio Access Network; Evolved Universal Terrestrial Radio Access (E-UTRA); User Equipment (UE) procedures in idle mode (Release 15)," 3GPP TS 36.304 V15.2.0 (Dec. 2018).
R1-1718482 , "Remaining issues on 2,4,7,9 beam management", Interdigital et al: 3rd Generation Partnership Project (3GPP), Mobile Competence Centre ; 650, Route Des Lucioles ; F-06921 Sophia-Antipolis Cedex ; France vol. RAN WGI, No. Prague, Czech Republic; XP051353068, Oct. 9, 2017-Oct. 13, 2017, 11 Pages.
R1-1800100 , "Summary of remaining issues of beam measurement, reporting and indication", Huawei et al: 3rd Generation Partnership Project (3GPP), Mobile Competence Centre ; 650, Route Des Lucioles ; F-06921 Sophia-Antipolis Cedex; France vol. RAN WGI, No. Vancouver, Canada; XP051384596, Jan. 22, 2018-Jan. 26, 2018, 13 Pages.
R1-1800734, "Remaining issues on beam management,", Interdigital, Inc., 3GPP TSG RAN WG1 Meeting AH 1801, Vancouver, Canada, Jan. 22-26, 2018, 6 pages.
R1-1801581 , "Remaining details on beam management", Zte et al., 3rd Generation, Partnership Jroject (3GPP), Mobile Competence Centre; 650, Route Des Lucioles ; F-06921 Sophia-Antipolis Cedex ; France vol. RAN WGI, No. Athens, Greece; XP051396949, Feb. 26, 2018-Mar. 2, 2018, 6 Pages.
NTT Docomo, Inc., "Other aspects of bandwidth Parts," 3GPP TSG RAN WG1 Meeting AH 1801, R1-1800680, Vancouver, Canada (Jan. 22-26, 2018).
Nokia et al., Summary of offline discussions on QCL, 3GPP TSG RAN WG1 Meeting AH 1801, R1-1801115, Vancouver, Canada (Jan. 22-26, 2018).
Nokia et al., Summary of QCL, 3GPP TSG RAN WG1 Meeting AH 1801, R1-1801054, Vancouver, Canada 'Jan. 22-26, 2018).
VIVO, Remaining issues on beam measurement and reporting, 3GPP TSG RAN WG1 Meeting #92, R1-1801520, Athens, Greece (Feb. 26-Mar. 2, 2018).
Third Generation Partnership Project (3GPP), "Summary of Beam Mgmt.", Qualcomm, 3GPP TSG RAN WG1 Meeting #91, Reno, USA, Nov. 27-Dec. 1, 2017, R1-1721696.

\* cited by examiner

SYSTEM AND METHOD FOR BANDWIDTH PART OPERATION

CROSS-REFERENCE TO RELATED APPLICATIONS

This application is a continuation of U.S. patent application Ser. No. 16/971,800, filed Aug. 21, 2020, which is the National Stage entry under 35 U.S.C. § 371 of Patent Cooperation Treaty Application No. PCT/US2019/019174, filed Feb. 22, 2019, which claims the benefit of U.S. Provisional Application No. 62/652,827, filed Apr. 4, 2018, and U.S. Provisional Application No. 62/634,601, filed Feb. 23, 2018, the entire contents of which are incorporated herein by reference.

BACKGROUND

A feature of fifth generation radio access network (5G RAN) or New Radio (NR) systems is downlink channel scheduling, including the selection of downlink transmission configuration and related parameters based at least in part on the instantaneous downlink channel conditions. Downlink channel scheduling may include devices (e.g., wireless transmit/receive units (WTRUs)) in the network providing channel-state information (CSI) to the network (e.g., a base station or gNB), which includes information used by the network to make scheduling decisions. CSI may be measured and/or reported on defined resources such as a bandwidth part (BWP), a contiguous set of resource blocks (RBs), physical resource blocks (PRBs), and/or virtual RBs within a carrier. For example, one or more BWPs may be configured in a carrier for the WTRU and one of the BWPs may be active at a time (and may be referred to as the active BWP or current active BWP).

SUMMARY

Methods and systems are described herein for bandwidth part (BWP) operation in 5G wireless systems. A wireless transmit/receive unit (WTRU), configured with at least one bandwidth part (BWP), may receive a signal including an indication for the WTRU to perform measurements on a target BWP, which may be received as part of downlink control information (DCI) in the current active BWP. The WTRU may determine a measurement gap type based on at least one of a subcarrier spacing (SCS) of a current active BWP and a SCS of the target BWP. The measurement gap type may be associated with a length value and may have a value that decreases as the SCS of the target BWP increases. The WTRU may determine a measurement gap for the target BWP based on the measurement gap type. The WTRU may measure channel state information (CSI) in the target BWP during the measurement gap. The WTRU may measure CSI in the target BWP by receiving and measuring CSI reference signals (CSI-RSs) in the target BWP. The WTRU may send a report including the measured CSI in the current active BWP.

BRIEF DESCRIPTION OF THE DRAWINGS

A more detailed understanding may be had from the following description, given by way of example in conjunction with the accompanying drawings, wherein like reference numerals in the figures indicate like elements, and wherein.

DETAILED DESCRIPTION

Figure 1A:
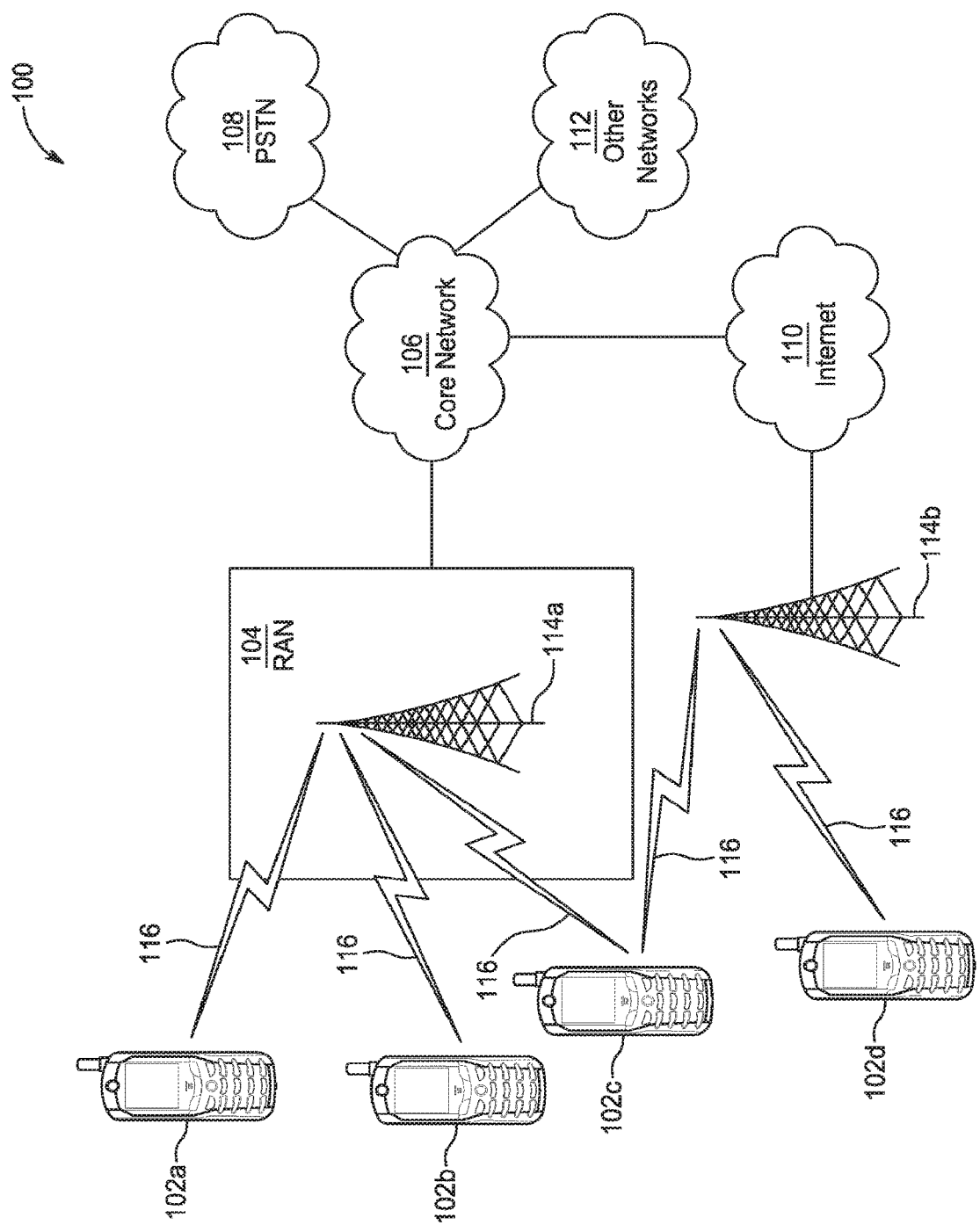
FIG. 1A is a system diagram illustrating an example communications system in which one or more disclosed embodiments may be implemented.

FIG. 1A is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word discrete Fourier transform Spread OFDM (ZT-UW-DFT-S-OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102a, 102b, 102c, 102d, a radio access network (RAN) 104, a core network (CN) 106, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d, any of which may be referred to as a station (STA), may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102a, 102b, 102c and 102d may be interchangeably referred to as a UE.

The communications systems 100 may also include a base station 114a and/or a base station 114b. Each of the base stations 114a, 114b may be any type of device configured to wirelessly interface with at least one of the WTRUs 102a, 102b, 102c, 102d to facilitate access to one or more communication networks, such as the CN 106, the Internet 110, and/or the other networks 112. By way of example, the base stations 114a, 114b may be a base transceiver station (BTS), a NodeB, an eNode B (eNB), a Home Node B, a Home eNode B, a next generation NodeB, such as a gNode B (gNB), a new radio (NR) NodeB, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104, which may also include other base stations and/or network elements (not shown), such as a base station controller (BSC), a radio network controller (RNC), relay nodes, and the like. The base station 114a and/or the base station 114b may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114a may be divided into three sectors. Thus, in one embodiment, the base station 114a may include three transceivers, i.e., one for each sector of the cell. In an embodiment, the base station 114a may employ multiple-input multiple output (M IMO) technology and may utilize multiple transceivers for each sector of the cell. For example, beamforming may be used to transmit and/or receive signals in desired spatial directions.

The base stations 114a, 114b may communicate with one or more of the WTRUs 102a, 102b, 102c, 102d over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104 and the WTRUs 102a, 102b, 102c may implement a radio technology such as Universal Mobile Telecommunications System (UMTS) Terrestrial Radio Access (UTRA), which may establish the air interface 116 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed Uplink (UL) Packet Access (HSUPA).

In an embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114a and the WTRUs 102a, 102b, 102c may implement a radio technology such as NR Radio Access, which may establish the air interface 116 using NR.

In an embodiment, the base station 114a and the WTRUs 102a, 102b, 102c may implement multiple radio access technologies. For example, the base station 114a and the WTRUs 102a, 102b, 102c may implement LTE radio access and NR radio access together, for instance using dual connectivity (DC) principles. Thus, the air interface utilized by WTRUs 102a, 102b, 102c may be characterized by multiple types of radio access technologies and/or transmissions sent to/from multiple types of base stations (e.g., an eNB and a gNB).

In other embodiments, the base station 114a and the WTRUs 102a, 102b, 102c may implement radio technologies such as IEEE 802.11 (i.e., Wireless Fidelity (WiFi), IEEE 802.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In one embodiment, the base station 114b and the WTRUs 102c, 102d may implement a radio technology such as IEEE 802.11 to establish a wireless local area network (WLAN). In an embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, LTE-A Pro, NR etc.) to establish a picocell or femtocell. As shown in FIG. 1A, the base station 114b may have a direct connection to the Internet 110. Thus, the base station 114b may not be required to access the Internet 110 via the CN 106.

The RAN 104 may be in communication with the CN 106, which may be any type of network configured to provide voice, data, applications, and/or voice over internet protocol (VoIP) services to one or more of the WTRUs 102a, 102b, 102c, 102d. The data may have varying quality of service (QoS) requirements, such as differing throughput requirements, latency requirements, error tolerance requirements, reliability requirements, data throughput requirements, mobility requirements, and the like. The CN 106 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104 and/or the CN 106 may be in direct or indirect communication with other RANs that employ the same RAT as the RAN 104 or a different RAT. For example, in addition to being connected to the RAN 104, which may be utilizing a NR radio technology, the CN 106 may also be in communication with another RAN (not shown) employing a GSM, UMTS, CDMA 2000, WiMAX, E-UTRA, or WiFi radio technology.

The CN 106 may also serve as a gateway for the WTRUs 102a, 102b, 102c, 102d to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104 or a different RAT.

Some or all of the WTRUs 102a, 102b, 102c, 102d in the communications system 100 may include multi-mode capabilities (e.g., the WTRUs 102a, 102b, 102c, 102d may include multiple transceivers for communicating with different wireless networks over different wireless links). For example, the WTRU 102c shown in FIG. 1A may be configured to communicate with the base station 114a, which may employ a cellular-based radio technology, and with the base station 114b, which may employ an IEEE 802 radio technology.

Figure 1B:
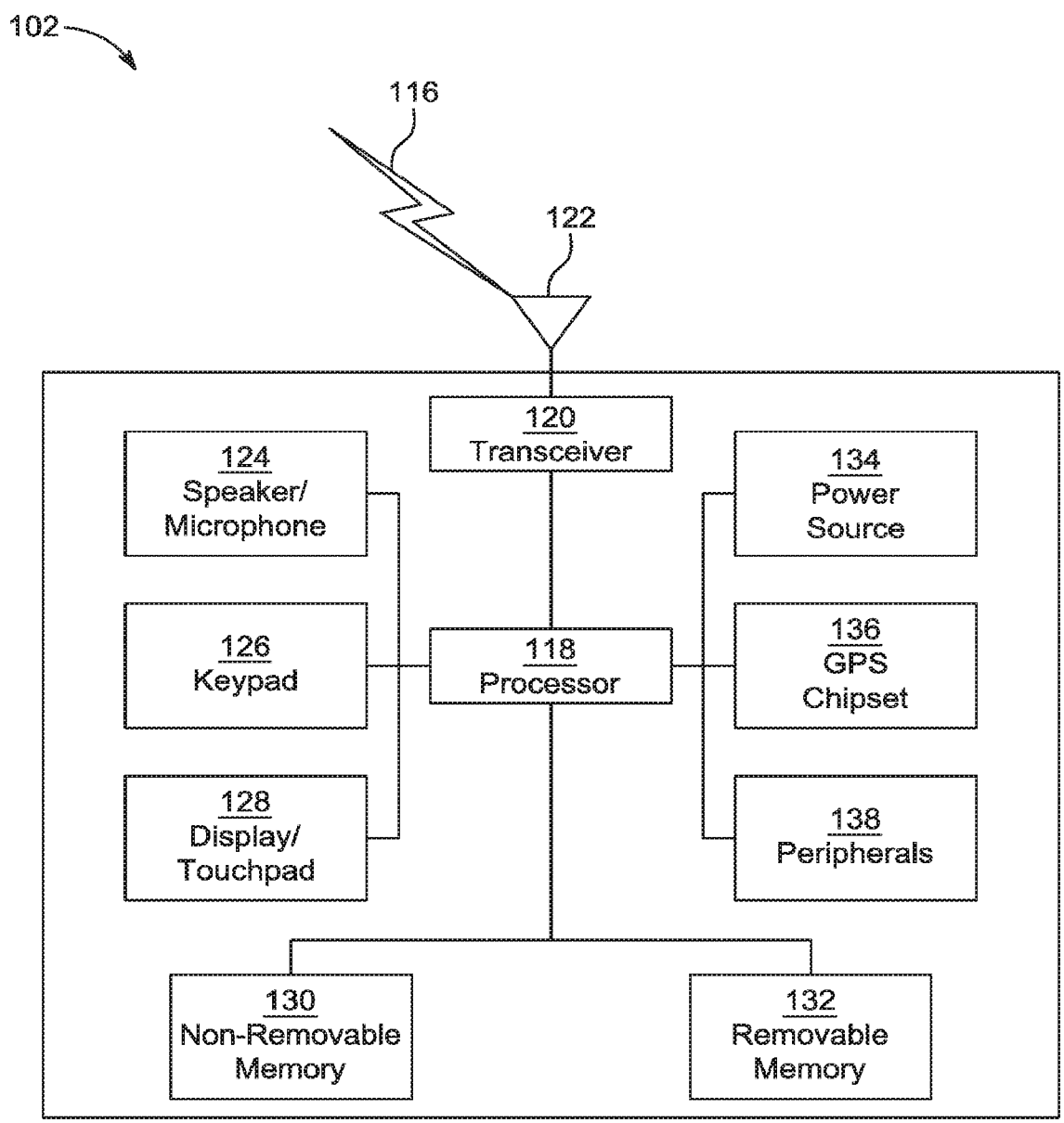
FIG. 1B is a system diagram illustrating an example wireless transmit/receive unit (WTRU) that may be used within the communications system illustrated in FIG. 1A according to an embodiment.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs), any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a Virtual Reality and/or Augmented Reality (VR/AR) device, an activity tracker, and the like. The peripherals 138 may include one or more sensors. The sensors may be one or more of a gyroscope, an accelerometer, a hall effect sensor, a magnetometer, an orientation sensor, a proximity sensor, a temperature sensor, a time sensor; a geolocation sensor, an altimeter, a light sensor, a touch sensor, a magnetometer, a barometer, a gesture sensor, a biometric sensor, a humidity sensor and the like.

The WTRU 102 may include a full duplex radio for which transmission and reception of some or all of the signals (e.g., associated with particular subframes for both the UL (e.g., for transmission) and DL (e.g., for reception) may be concurrent and/or simultaneous. The full duplex radio may include an interference management unit to reduce and or substantially eliminate self-interference via either hardware (e.g., a choke) or signal processing via a processor (e.g., a separate processor (not shown) or via processor 118). In an embodiment, the WTRU 102 may include a half-duplex radio for which transmission and reception of some or all of the signals (e.g., associated with particular subframes for either the UL (e.g., for transmission) or the DL (e.g., for reception)).

Figure 1C:
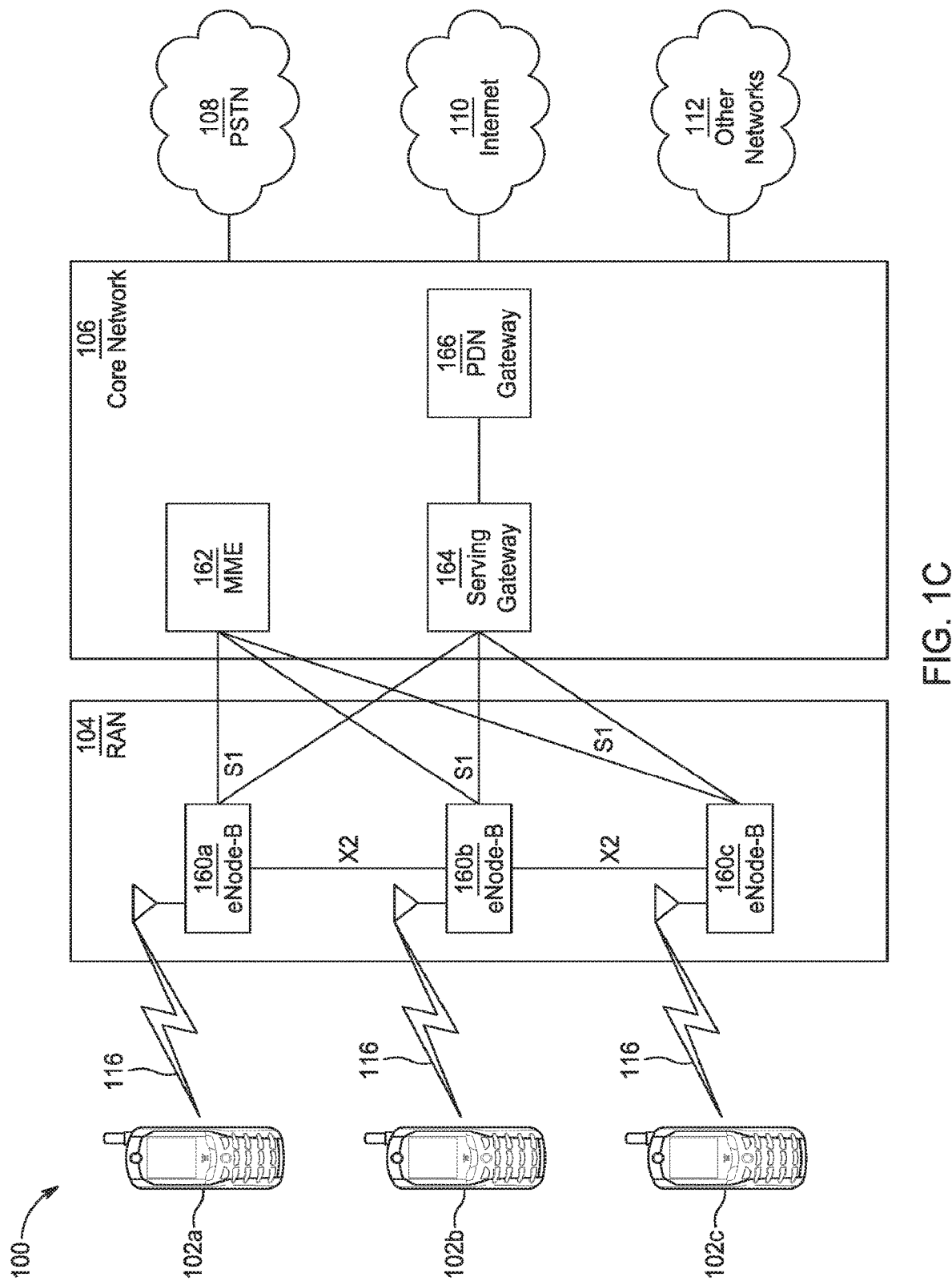
FIG. 1C is a system diagram illustrating an example radio access network (RAN) and an example core network (CN) that may be used within the communications system illustrated in FIG. 1A according to an embodiment.

FIG. 1C is a system diagram illustrating the RAN 104 and the CN 106 according to an embodiment. As noted above, the RAN 104 may employ an E-UTRA radio technology to communicate with the WTRUs 102a, 102b, 102c over the air interface 116. The RAN 104 may also be in communication with the CN 106.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In one embodiment, the eNode-Bs 160a, 160b, 160c may implement MIMO technology. Thus, the eNode-B 160a, for example, may use multiple antennas to transmit wireless signals to, and/or receive wireless signals from, the WTRU 102a.

Each of the eNode-Bs 160a, 160b, 160c may be associated with a particular cell (not shown) and may be configured to handle radio resource management decisions, handover decisions, scheduling of users in the UL and/or DL, and the like. As shown in FIG. 1C, the eNode-Bs 160a, 160b, 160c may communicate with one another over an X2 interface.

The CN 106 shown in FIG. 1C may include a mobility management entity (MME) 162, a serving gateway (SGW) 164, and a packet data network (PDN) gateway (PGW) 166. While the foregoing elements are depicted as part of the CN 106, it will be appreciated that any of these elements may be owned and/or operated by an entity other than the CN operator.

The MME 162 may be connected to each of the eNode-Bs 162a, 162b, 162c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may provide a control plane function for switching between the RAN 104 and other RANs (not shown) that employ other radio technologies, such as GSM and/or WCDMA.

The SGW 164 may be connected to each of the eNode Bs 160a, 160b, 160c in the RAN 104 via the S1 interface. The SGW 164 may generally route and forward user data packets to/from the WTRUs 102a, 102b, 102c. The SGW 164 may perform other functions, such as anchoring user planes during inter-eNode B handovers, triggering paging when DL data is available for the WTRUs 102a, 102b, 102c, managing and storing contexts of the WTRUs 102a, 102b, 102c, and the like.

The SGW 164 may be connected to the PGW 166, which may provide the WTRUs 102a, 102b, 102c with access to packet-switched networks, such as the Internet 110, to facilitate communications between the WTRUs 102a, 102b, 102c and IP-enabled devices.

The CN 106 may facilitate communications with other networks. For example, the CN 106 may provide the WTRUs 102a, 102b, 102c with access to circuit-switched networks, such as the PSTN 108, to facilitate communications between the WTRUs 102a, 102b, 102c and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers.

Although the WTRU is described in FIGS. 1A-1D as a wireless terminal, it is contemplated that in certain representative embodiments that such a terminal may use (e.g., temporarily or permanently) wired communication interfaces with the communication network.

In representative embodiments, the other network 112 may be a WLAN.

A WLAN in Infrastructure Basic Service Set (BSS) mode may have an Access Point (AP) for the BSS and one or more stations (STAs) associated with the AP. The AP may have access or an interface to a Distribution System (DS) or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an "ad-hoc" mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width. The primary channel may be the operating channel of the BSS and may be used by the STAs to establish a connection with the AP. In certain representative embodiments, Carrier Sense Multiple Access with Collision Avoidance (CSMA/CA) may be implemented, for example in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High Throughput (HT) STAs may use a 40 MHz wide channel for communication, for example, via a combination of the primary 20 MHz channel with an adjacent or nonadjacent 20 MHz channel to form a 40 MHz wide channel.

Very High Throughput (VHT) STAs may support 20 MHz, 40 MHz, 80 MHz, and/or 160 MHz wide channels. The 40 MHz, and/or 80 MHz, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing, and time domain processing, may be done on each stream separately. The streams may be mapped on to the two 80 MHz channels, and the data may be transmitted by a transmitting STA. At the receiver of the receiving STA, the above described operation for the 80+80 configuration may be reversed, and the combined data may be sent to the Medium Access Control (MAC).

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHz, 10 MHz, and 20 MHz bandwidths in the TV White Space (TVWS) spectrum, and 802.11ah supports 1 MHz, 2 MHz, 4 MHz, 8 MHz, and 16 MHz bandwidths using non-TVWS spectrum. According to a representative embodiment, 802.11ah may support Meter Type Control/Machine-Type Communications (MTC), such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHz, 4 MHz, 8 MHz, 16 MHz, and/or other channel bandwidth operating modes. Carrier sensing and/or Network Allocation Vector (NAV) settings may depend on the status of the primary channel. If the primary channel is busy, for example, due to a STA (which supports only a 1 MHz operating mode) transmitting to the AP, all available frequency bands may be considered busy even though a majority of the available frequency bands remains idle.

In the United States, the available frequency bands, which may be used by 802.11ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code.

Figure 1D:
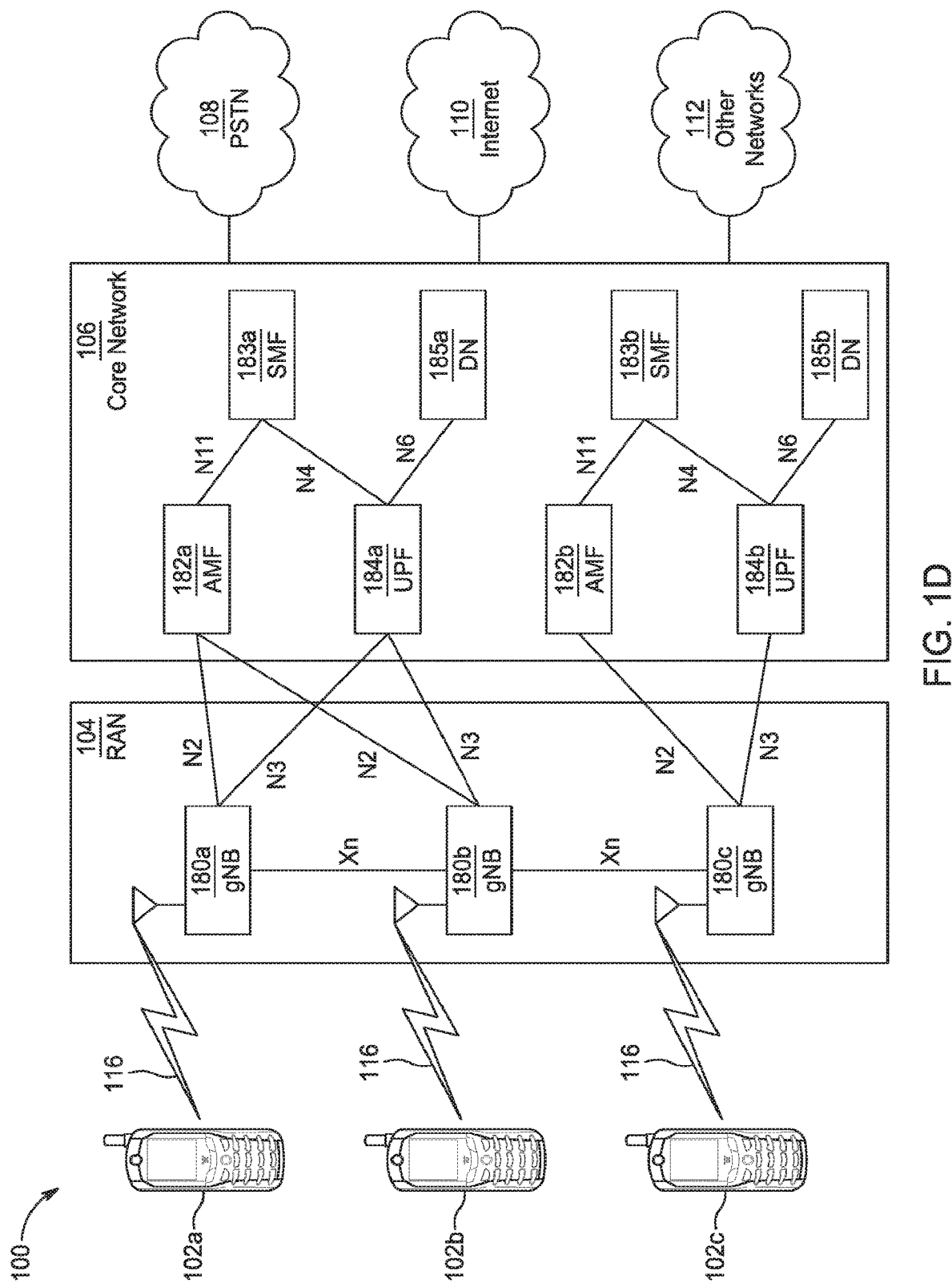
FIG. 1D is a system diagram illustrating a further example RAN and a further example CN that may be used within the communications system illustrated in FIG. 1A according to an embodiment.

FIG. 1D is a system diagram illustrating the RAN 104 and the CN 106 according to an embodiment. As noted above, the RAN 104 may employ an NR radio technology to communicate with the WTRUs 102a, 102b, 102c over the air interface 116. The RAN 104 may also be in communication with the CN 106.

The RAN 104 may include gNBs 180a, 180b, 180c, though it will be appreciated that the RAN 104 may include any number of gNBs while remaining consistent with an embodiment. The gNBs 180a, 180b, 180c may each include one or more transceivers for communicating with the WTRUs 102a, 102b, 102c over the air interface 116. In one embodiment, the gNBs 180a, 180b, 180c may implement MIMO technology. For example, gNBs 180a, 108b may utilize beamforming to transmit signals to and/or receive signals from the gNBs 180a, 180b, 180c. Thus, the gNB 180a, for example, may use multiple antennas to transmit wireless signals to, and/or receive wireless signals from, the WTRU 102a. In an embodiment, the gNBs 180a, 180b, 180c may implement carrier aggregation technology. For example, the gNB 180a may transmit multiple component carriers to the WTRU 102a (not shown). A subset of these component carriers may be on unlicensed spectrum while the remaining component carriers may be on licensed spectrum. In an embodiment, the gNBs 180a, 180b, 180c may implement Coordinated Multi-Point (CoMP) technology. For example, WTRU 102a may receive coordinated transmissions from gNB 180a and gNB 180b (and/or gNB 180c).

The WTRUs 102a, 102b, 102c may communicate with gNBs 180a, 180b, 180c using transmissions associated with a scalable numerology. For example, the OFDM symbol spacing and/or OFDM subcarrier spacing may vary for different transmissions, different cells, and/or different portions of the wireless transmission spectrum. The WTRUs 102a, 102b, 102c may communicate with gNBs 180a, 180b, 180c using subframe or transmission time intervals (TTIs) of various or scalable lengths (e.g., containing a varying number of OFDM symbols and/or lasting varying lengths of absolute time).

The gNBs 180a, 180b, 180c may be configured to communicate with the WTRUs 102a, 102b, 102c in a standalone configuration and/or a non-standalone configuration. In the standalone configuration, WTRUs 102a, 102b, 102c may communicate with gNBs 180a, 180b, 180c without also accessing other RANs (e.g., such as eNode-Bs 160a, 160b, 160c). In the standalone configuration, WTRUs 102a, 102b, 102c may utilize one or more of gNBs 180a, 180b, 180c as a mobility anchor point. In the standalone configuration, WTRUs 102a, 102b, 102c may communicate with gNBs 180a, 180b, 180c using signals in an unlicensed band. In a non-standalone configuration WTRUs 102a, 102b, 102c may communicate with/connect to gNBs 180a, 180b, 180c while also communicating with/connecting to another RAN such as eNode-Bs 160a, 160b, 160c. For example, WTRUs 102a, 102b, 102c may implement DC principles to communicate with one or more gNBs 180a, 180b, 180c and one or more eNode-Bs 160a, 160b, 160c substantially simultaneously. In the non-standalone configuration, eNode-Bs 160a, 160b, 160c may serve as a mobility anchor for WTRUs 102a, 102b, 102c and gNBs 180a, 180b, 180c may provide additional coverage and/or throughput for servicing WTRUs 102a, 102b, 102c.

Each of the gNBs 180a, 180b, 180c may be associated with a particular cell (not shown) and may be configured to handle radio resource management decisions, handover decisions, scheduling of users in the UL and/or DL, support of network slicing, DC, interworking between NR and E-UTRA, routing of user plane data towards User Plane Function (UPF) 184a, 184b, routing of control plane information towards Access and Mobility Management Function (AMF) 182a, 182b and the like. As shown in FIG. 1D, the gNBs 180a, 180b, 180c may communicate with one another over an Xn interface.

The CN 106 shown in FIG. 1D may include at least one AMF 182a, 182b, at least one UPF 184a,184b, at least one Session Management Function (SMF) 183a, 183b, and possibly a Data Network (DN) 185a, 185b. While the foregoing elements are depicted as part of the CN 106, it will be appreciated that any of these elements may be owned and/or operated by an entity other than the CN operator.

The AMF 182a, 182b may be connected to one or more of the gNBs 180a, 180b, 180c in the RAN 104 via an N2 interface and may serve as a control node. For example, the AMF 182a, 182b may be responsible for authenticating users of the WTRUs 102a, 102b, 102c, support for network slicing (e.g., handling of different protocol data unit (PDU) sessions with different requirements), selecting a particular SMF 183a, 183b, management of the registration area, termination of non-access stratum (NAS) signaling, mobility management, and the like. Network slicing may be used by the AMF 182a, 182b in order to customize CN support for WTRUs 102a, 102b, 102c based on the types of services being utilized WTRUs 102a, 102b, 102c. For example, different network slices may be established for different use cases such as services relying on ultra-reliable low latency (URLLC) access, services relying on enhanced massive mobile broadband (eMBB) access, services for MTC access, and the like. The AMF 182a, 182b may provide a control plane function for switching between the RAN 104 and other RANs (not shown) that employ other radio technologies, such as LTE, LTE-A, LTE-A Pro, and/or non-3GPP access technologies such as WiFi.

The SMF 183a, 183b may be connected to an AMF 182a, 182b in the CN 106 via an N11 interface. The SMF 183a, 183b may also be connected to a UPF 184a, 184b in the CN 106 via an N4 interface. The SMF 183a, 183b may select and control the UPF 184a, 184b and configure the routing of traffic through the UPF 184a, 184b. The SMF 183a, 183b may perform other functions, such as managing and allocating UE IP address, managing PDU sessions, controlling policy enforcement and QoS, providing DL data notifications, and the like. A PDU session type may be IP-based, non-IP based, Ethernet-based, and the like.

The UPF 184a, 184b may be connected to one or more of the gNBs 180a, 180b, 180c in the RAN 104 via an N3 interface, which may provide the WTRUs 102a, 102b, 102c with access to packet-switched networks, such as the Internet 110, to facilitate communications between the WTRUs 102a, 102b, 102c and IP-enabled devices. The UPF 184, 184b may perform other functions, such as routing and forwarding packets, enforcing user plane policies, supporting multi-homed PDU sessions, handling user plane QoS, buffering DL packets, providing mobility anchoring, and the like.

The CN 106 may facilitate communications with other networks. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers. In one embodiment, the WTRUs 102a, 102b, 102c may be connected to a local DN 185a, 185b through the UPF 184a, 184b via the N3 interface to the UPF 184a, 184b and an N6 interface between the UPF 184a, 184b and the DN 185a, 185b.

In view of FIGS. 1A-1D, and the corresponding description of FIGS. 1A-1D, one or more, or all, of the functions described herein with regard to one or more of: WTRU 102a-d, Base Station 114a-b, eNode-B 160a-c, MME 162, SGW 164, PGW 166, gNB 180a-c, AMF 182a-b, UPF 184a-b, SMF 183a-b, DN 185a-b, and/or any other device (s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

Figure 2:
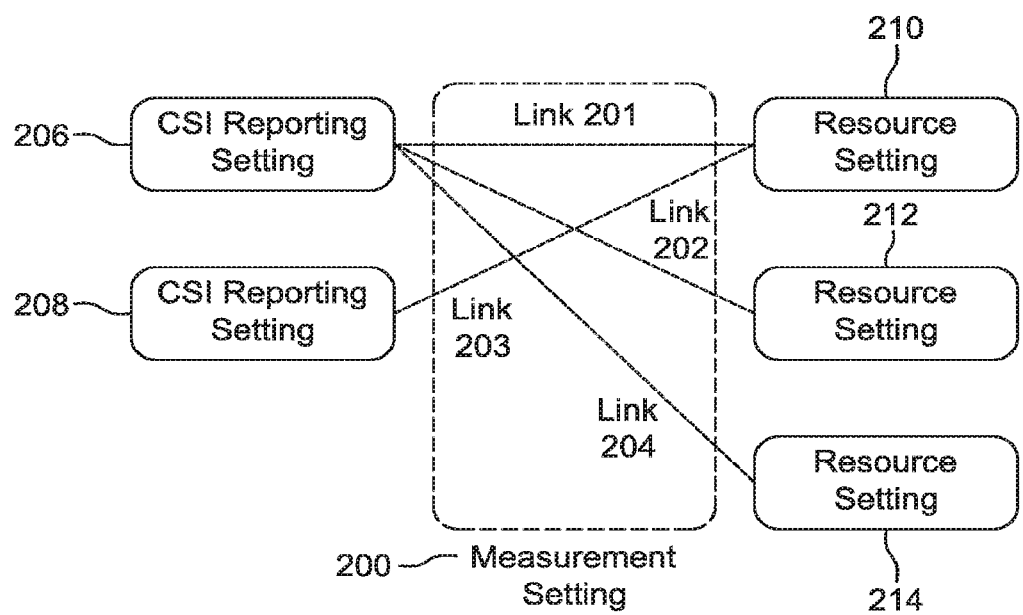
FIG. 2 is a diagram of an example channel state information (CSI) measurement.

Channel state information (CSI) may be gathered by a receiver (e.g., by performing channel estimation on received reference signals RSs)) and fed back to the transmitter to enable the transmitter to adapt transmissions to current channel conditions. An example CSI framework may be defined for fifth generation (5G) New Radio (NR) systems and may include a CSI measurement setting. For example, in a CSI measurement setting, any one or more of the following configuration parameters may be provided: N≤1 CSI reporting settings; M≤1 resource settings; and/or a CSI measurement setting that links the N CSI reporting settings with the M resource settings. FIG. 2 is a diagram of an example CSI measurement setting 200, which may be used in NR. For example, a WTRU may be configured with CSI measurement setting 200. CSI measurement setting 200 may include, but is not limited to, one or more CSI reporting settings 206, 208, resource settings 210, 212, 214, and/or links 201, 202, 203, 204 between the CSI reporting settings 206, 208 and the resource settings 210, 212, 214. As used herein, the term measurement may include or may be interchangeably used with a CSI measurement, radio link monitoring (RLM) measurement, radio resource management (RRM) measurement, reference signal received power (RSRP) measurement, and channel quality indicator (CQI) measurement.

A CSI reporting setting may include any one or more of the following example parameters: Report setting identity (ReportConfigID); ReportConfigType (e.g., periodic, aperiodic, or semi-persistent); ReportQuantity (e.g. CSI-related or layer 1 reference signal received power (L1-RSRP) related); ReportFreqConfiguration (e.g., reporting granularity in frequency domain); subband or wideband precoding matrix indicator (WB PMI); channel quality indicator (CQI) reporting; ReportSlotConfig (e.g., periodicity and slot offset for periodic or semi-persistent reporting); MeasRestriction-Config-time-channel (e.g., time domain measurement restriction for channel in the unit of slot); CodebookConfig (type and codebook subset restriction with a CSI type (e.g., type I or II) and/or codebook configuration that includes codebook subset restriction); a strongest layer indicator (LI); reported L1-RSRP parameters; a channel resource indicator (CRI), and/or synchronization signal block resource indicator (SSBRI).

A resource setting may include any one or more of the following example parameters: time-domain behavior (e.g., aperiodic or periodic/semi-persistent); reference signal (RS) type (e.g., for channel measurement or interference measurement); and/or S≥1 resource set(s), such that each resource set may contain Ks resources. A CSI measurement setting may include any one or more of the following example parameters: CSI reporting setting; one resource setting for CQI; and a reference transmission scheme setting. For CSI reporting for a component carrier, any one or more of the following frequency granularities may be supported: wideband CSI; partial band CSI; and/or subband CSI.

5G NR includes the use of bandwidth parts (BWPs) to add flexibility to resource usage. BWP operation may include the configuration of a WTRU with one or more BWPs in a carrier. For example, up to 4 downlink/uplink (DL/UL) bandwidth parts (BWPs) may be configured per carrier. From the perspective of a WTRU, a single DL and UL BWP may be active at a time, and may be referred to as the active BWP with respect to the WTRU.

Parameters may be configured for each BWP, such as any of the example parameters described in the following. For example, for each BWP, a number of contiguous physical resource blocks (PRBs) (e.g., DL-BWP-bandwidth (DL-BWP-BW) and/or UL-BWP-BW) may be configured. For example, the BWP size may range from 1 to 275 PRBs (e.g., it can be as small as 1 PRB and as large as 275 PRBs, which may be the maximum bandwidth of a carrier). For each BWP, frequency location (e.g., DL-BWP-loc or UL-BWP-loc) of the BWP may be configured, and may be an offset of the first PRB of the DL/UL BWP. Other example configuration parameters for a BWP include, but are not limited to, any of the following parameters: subcarrier spacing (SCS) of the BWP (e.g., DL-BWP-mu or UL-BWP-mu); cyclic prefix length of the BWP (e.g., DL-BWP-CP or UL-BWP-CP); control resource sets (CORESETs) for all types of search space for DL BWPs in a primary cell; physical uplink control channel (PUCCH) resource set for UL BWPs; Type0-PDCCH common search space (RMSI CORESET); BWP index (DL-BWP-index, UL-BWP-index); and/or BWP indicator field in DCI format 1_1 to indicate active DL BWP and BWP indicator field in DCI format 0_1 to indicate active UL BWP.

In other examples, for each BWP, for a primary cell (Pcell), a WTRU may be provided (via a higher layer parameter such as Default-DL-BWP) a default DL BWP among configured DL BWPs. For example, if a WTRU is not provided a default DL BWP parameter via a higher layer, the default BWP may be the initial active DL BWP. In an example, for each BWP, a timer, BWP-InactivityTimer, may be configured via a higher layer (e.g., maximum 50 ms), and a WTRU may increase the timer if the WTRU does not receive any DCI (e.g., by 1 ms for bandwidths under 6 GHz, and by 0.5 ms for bandwidths over 6 GHz). When the timer expires, the WTRU may switch to the default DL BWP from an active DL BWP.

In an example, in paired spectrum (e.g., frequency division duplex (FDD)), a WTRU may not expect to transmit HARQ-ACK if the active UL BWP is changed in between the detection of UL grant and its associated HARQ-ACK feedback. In this case, DL and UL BWPs may be configured separately and independently. For example, DCI for DL may be used for a DL BWP switch and DCI for UL may be used for an UL BWP switch. In unpaired spectrum (e.g., time division duplex (TDD)), a DL BWP and an UL BWP may be configured jointly as a pair and may share the same center frequency. However, the bandwidth may be different (e.g., DL or UL DCI may be used to switch BWP).

In other example, for each BWP, a measurement gap may be supported. A WTRU may not be expected to monitor the physically downlink control channel (PDCCH) when the WTRU performs measurements over a bandwidth that is not within the DL BWP for the WTRU (for RRM measurement from a synchronization signal block (SSB or SS block)). Regarding retuning time for each BWP (e.g., the retuning time may be approximately 50 μs or 1 symbol with 15 kHz SCS), the PDCCH and associated physical downlink shared channel (PDSCH) may be in the same BWP if the gap between PDCCH and PDSCH is smaller than parameter K, where K may be dependent on numerology and/or the WTRU retuning time. Otherwise, the PDCCH and the associated PDSCH may be transmitted in different BWPs. In other examples, the CSI-reference signal (CSI-RS) resource, CSI reporting setting, and/or resource settings may be configured per BWP. A sounding reference signal (SRS) may be transmitted within a BWP even when frequency hopping is activated. A timing reference signal (TRS) can be configured for a BWP (e.g., when an SSB is not located in the BWP). For example, a WTRU may not expect to receive the TRS outside the BWP.

Figure 3:
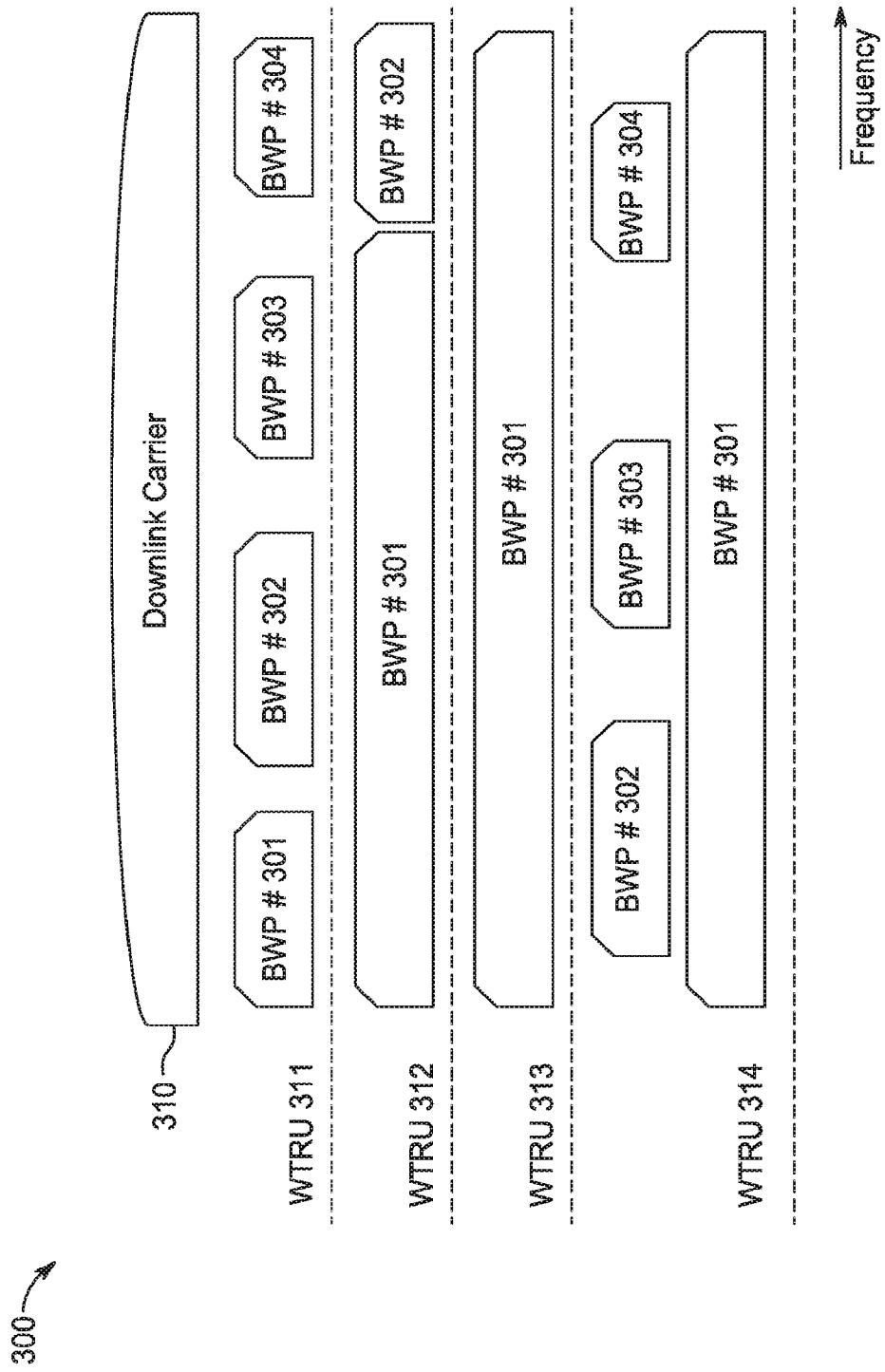
FIG. 3 is a frequency assignment diagram of an example WTRU-specific bandwidth part (BWP) configuration in a downlink carrier.

The number of BWPs, the bandwidth of each BWP, and/or frequency locations of the configured BWPs may be independently configured in a WTRU-specific manner based on, for example, the WTRU capability, channel conditions of a WTRU, and/or the system environment. FIG. 3 is a frequency assignment diagram of an example WTRU-specific BWP configuration 300 in a downlink carrier 310. Each WTRU 311, 312, 313 and 314 may be individually configured with one or more of the BWPs 301, 302, 303 and/or 304, as shown in the example of FIG. 3, such that the bandwidths of the configured BWPs 301, 302, 303 and/or 304 may be different (or the same) among the WTRUs 311, 312, 313 and 314. For example, WTRU 311 may be configured with BWPs 301, 302, 303 and 304 with narrow bands, while WTRU 313 may be configured with BWP 301 with a wideband.

CSI reporting may be performed for multiple BWPs. When a WTRU is configured to report CSI, any one or more of following mechanisms may be applied. A CSI report setting may be associated with a single DL BWP and/or may include associated DL BWP information. An associated DL BWP may be configured per resource setting. All linked resource settings of a CSI report setting may be associated with the same BWP. A periodic or semi-persistent CSI, associated with a DL BWP, scheduled for reporting in slot n, may be reported if the associated DL BWP was the active DL BWP in the time location of the CSI reference resource (e.g., a slot nCQI, REF=n-nCQI, REF, OFFSET) for the CSI report. For aperiodic CSI reporting, a WTRU may not be expected to be triggered with a CSI report for a non-active DL BWP. A dropping rule may apply when the active BWP is switched. In an example of a dropping rule, a WTRU may drop any CSI reporting if the time location of PUSCH/PUCCH resource is later than the BWP switch. In another example of a dropping rule, the WTRU may report CSI in a different BWP. Right after a BWP switch, a minimum time may be needed to report periodic CSI reporting (e.g., associated CSI-RS may need to be measured after the active BWP switch).

In 5G, two antenna ports are considered quasi co-located (QCL) if a WTRU may derive large scale channel properties of one antenna port from measurement on the other antenna port. In 5G NR, one or more quasi co-location (QCL) types may be defined and used. For example, QCL type A may be defined and used as Doppler shift, Doppler spread, average delay, and/or delay spread. QCL type B may be defined and used as Doppler shift, and/or Doppler spread. QCL type C may be defined and used as average delay, and/or Doppler shift. QCL type D may be defined and used as spatial reception (Rx). One or more QCL types may be used to indicate a QCL relationship between two reference signals, wherein a reference RS and a target RS may be used to indicate the QCL relationship. An example of QCL linkage between two reference signals is shown in Table 1.

Figure 4:
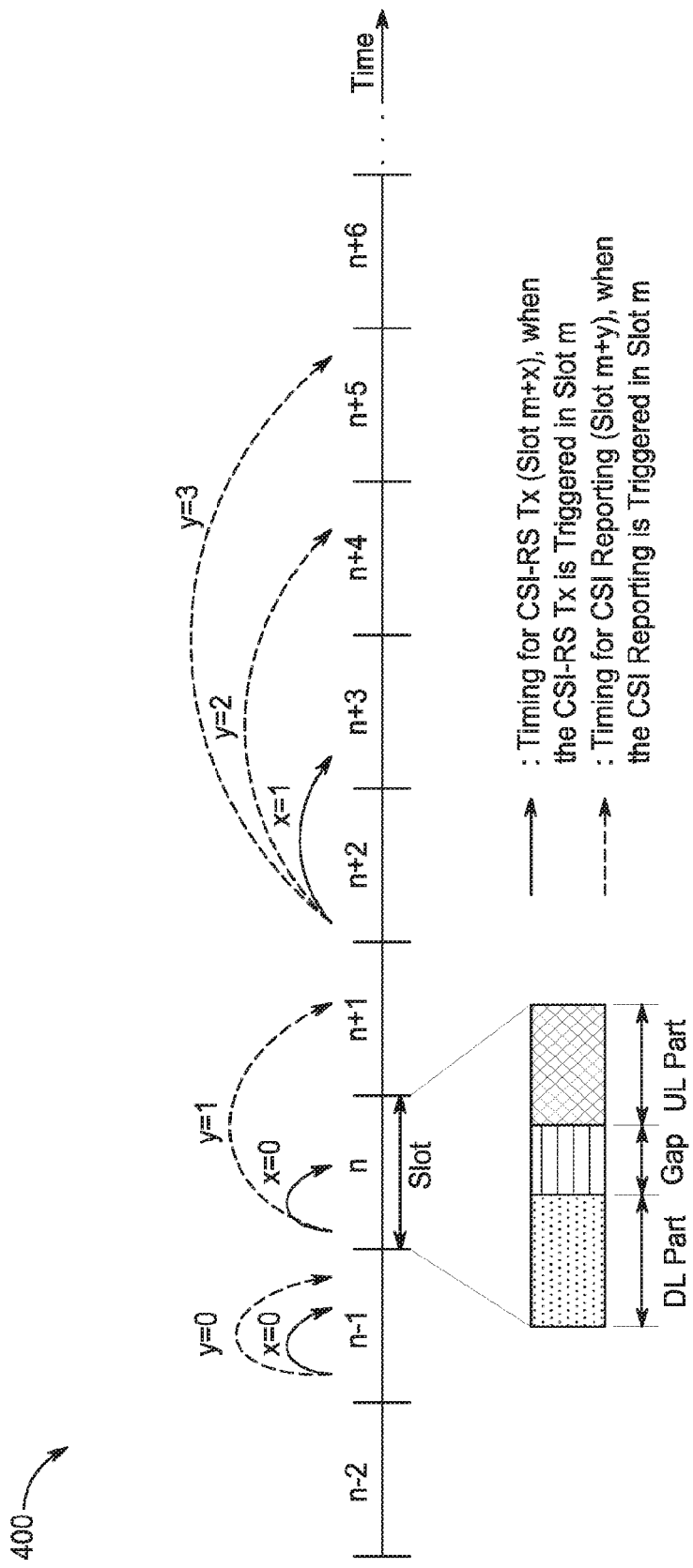
FIG. 4 is a timing diagram of an example procedure for indicating aperiodic CSI-reference signal (CSI-RS) transmission and aperiodic CSI reporting timing.

For an aperiodic CSI-RS transmission, a DCI may be used to trigger (e.g., indicate) an aperiodic CSI-RS transmission and the DCI may indicate the timing of the CSI-RS transmission. If an aperiodic CSI-RS is triggered (e.g., indicated) in a slot #m, the triggered (e.g., indicated) aperiodic CSI-RS may be transmitted in the slot #m+x, where the x may be indicated in the associated DCI. A WTRU may be triggered (e.g., requested) to report an aperiodic CSI which may be measured based on a periodic, a semi-persistent, and/or an aperiodic CSI-RS. The aperiodic CSI reporting may be triggered (e.g., requested) via a DCI which may be received in a slot #m, the aperiodic CSI may be reported in slot #m+y, wherein the y may be indicated in the associated DCI. FIG. 4 is a timing diagram of an example procedure 400 for indicating aperiodic CSI-RS transmission and aperiodic CSI reporting timing. As illustrated in FIG. 4, x for aperiodic CSI-RS transmission and y for aperiodic CSI reporting timing are indicated as example timing offsets when the aperiodic CSI-RS and aperiodic CSI reporting are triggered (e.g., indicated and/or requested) in slot #m (e.g., slot n+2).

One or more BWPs may be configured in a carrier for a WTRU and among them, one (e.g., only one) BWP may be active (e.g., at a time). The BWP that is active at the time may be referred to as an active BWP or a current active BWP. A WTRU may be indicated by the network (e.g., via DCI), to switch dynamically from an active BWP to another BWP (which then becomes the active BWP). However, when a WTRU is in an active BWP, the WTRU may not be able to measure and report CSI for a non-active BWP. Therefore, channel information for non-active BWP(s) may not be available at a gNB for channel scheduling when the gNB wants to switch the active BWP for a WTRU. This may result in system throughput degradation due to scheduling of BWPs without channel information. To address this issues, mechanisms are described herein for CSI reporting for non-active BWPs. In an example, a WTRU may be triggered, configured, and/or indicated to measure non-active BWP(s) with a measurement gap during which the WTRU may not be able to monitor a DL control channel in the active BWP. However, the scheduling restriction in an active BWP may cause system throughput performance reduction

TABLE 1

Example of QCL linkage between two reference signals

| QCL linkage for above 6 GHz after RRC | signaling |
|---|---|
| SSB → TRS with respect to (w.r.t) average delay, Doppler shift, spatial RX parameters | QCL type: C + D |
| TRS → CSI-RS for beam management (BM) w.r.t. average delay, Doppler shift, delay spread, Doppler spread estimation | QCL type: A |
| TRS → CSI-RS for CSI w.r.t. average delay, Doppler shift, delay spread, Doppler spread estimation | QCL type: A |
| TRS → demodulation reference signal (DMRS) for PDCCH w.r.t. average delay, Doppler shift, delay spread, Doppler spread estimation | QCL type: A |
| TRS → DMRS for PDSCH w.r.t. average delay, Doppler shift, delay spread, Doppler spread estimation | QCL type: A |
| SSB → CSI-RS for BM w.r.t. average delay, Doppler shift, spatial Rx parameters | QCL type: C + D |
| SSB → CSI-RS for CSI w.r.t, spatial RX parameters | QCL type: D |
| SSB → DMRS for PDCCH (before TRS is configured) w.r.t. average delay, Doppler shift, delay spread, Doppler spread, spatial RX parameters | QCL type: A + D |
| SSB → DMRS for PDSCH (before TRS is configured) w.r.t. average delay, Doppler shift, delay spread, Doppler spread, spatial RX parameters | QCL type: A + D |
| CSI-RS for BM → DMRS for PDCCH w.r.t. spatial RX parameters | QCL type: D |
| CSI-RS for BM → DMRS for PDSCH w.r.t., spatial RX parameters | QCL type: D |
| CSI-RS for CSI → DMRS for PDSCH w.r.t. average delay, Doppler shift, delay spread, Doppler spread, spatial RX parameters; Note: QCL parameters may not be derived directly from CSI-RS for CSI | QCL type: A + D | if the WTRU to measures non-active BWP(s) (and thus restricts the active BWP) frequently.

Methods for aperiodic, periodic, and/or semi-persistent CSI reporting for non-active BWPs are described herein with minimum impact on scheduling in an active BWP. In an example, CSI reporting for non-active BWPs, as described herein, may be used to minimize the scheduling restriction in the active BWP (e.g., due to the measurement gap for non-active BWP measurement. In an example, a measurement timer (e.g., a validity timer or prohibit timer) for a CSI measurement associated with a non-active BWP may be used. In this case, a WTRU may not (or may not need to) measure non-active BWP(s) unless the timer is in a state such as running or expired. This may reduce the non-active BWP measurement frequency.

In another example, a multi-type CSI reporting cycle may be used for periodic and/or semi-persistent CSI reporting. For example, when a WTRU is configured with periodic and/or semi-persistent CSI reporting (or CSI reporting setting) for a BWP, two types of reporting cycles (or periodicities) may be configured. The first type of reporting cycle may be used for the CSI reporting setting if the corresponding BWP is an active BWP. The second type of reporting cycle may be used for the CSI reporting setting if the corresponding BWP is a non-active BWP. In an example, the first type of reporting cycle may be shorter than the second type of reporting cycle, which may reduce the non-active BWP measurement frequency (in another example, the second type of reporting cycle may shorter than the first type of reporting cycle).

In another embodiment, a bandwidth expansion of an active BWP may be used. For example, if a CSI measurement of non-active BWP is needed, a gNB may indicate to expand the bandwidth of the active BWP to include the non-active BWP. In this case, no measurement gap may be needed to performing measurements on the non-active BWP. The use of bandwidth expansion of an active BWP may be used in the case when the target BWP for CSI measurement has a same numerology (e.g., SCS) as the active BWP.

In another example, a wideband BWP may be used with subband CSI measurement reporting when CSI measurements of non-active BWPs are needed. For example, one of the configured BWPs (e.g., the lowest BWP index) may be based on a wideband BWP that may include all other BWPs in the frequency band. When a WTRU triggers to report CSI for non-active BWPs, the WTRU may switch to the wideband BWP and measure the CSI per subband, wherein each subband may be a same bandwidth with corresponding BWP. In another example, a flexible measurement gap may be used to minimize the scheduling restriction in an active BWP due to the CSI measurement of non-active BWP. A measurement gap window (or length) may be determined based on, for example, system parameters, numerology of the target BWP, and/or the number of non-active BWPs.

As used herein, a configured BWP that is not an active BWP may be referred to as a non-active BWP, a target BWP, an inactive BWP, and/or an unused BWP. The measurement for a non-active BWP may be referred to as an inter-BWP measurement, a target BWP measurement, or an inactive BWP measurement. A BWP may be a contiguous set of resource blocks (RBs), PRBs, or virtual RBs within a carrier. As used herein, the term BWP may be interchangeably used with a carrier segment, a narrow band (NB), a subband, or a local frequency band. A carrier may be a contiguous set of RBs, PRBs, or virtual RBs and the carrier's bandwidth may be equal to or greater than the bandwidth of a BWP configured in the carrier. As used herein, the term carrier may be interchangeably used with a component carrier, a primary cell (Pcell), a secondary cell (Scell), a primary secondary cell (PScell), or a cell. The terms RB, PRB, and virtual RB may be used interchangeably herein.

In an example of BWP configuration, a WTRU may be configured with one or more carriers, and each carrier may include one or more BWPs. For example, a WTRU may receive and/or transmit signals in one or more carriers at the same time as signals being transmitted/received in different carriers and may be fully or partially overlapped in time. The support of simultaneous reception/transmission in one or more carriers may be based on a WTRU capability. The support of simultaneous transmission in multiple carriers may be determined based on the transmission power (e.g., the required transmission power) of the uplink signals. One or more carriers configured, used, or determined for a WTRU may be non-overlapped in the frequency domain.

A WTRU may receive/transmit signals (e.g., only) in one BWP at a time from among the one or more BWPs configured for the same carrier. One or more BWPs configured, used, or determined for a WTRU in the same carrier may be fully or partially overlapped, or non-overlapped. The maximum number of RBs, PRBs, or virtual RBs for a BWP may be limited, determined, or a function of the WTRU category (e.g., category-1 WTRU may have a wideband capability and category-2 WTRU may have a narrowband capability). For example, a first maximum number of RBs, PRBs, or virtual RBs for a BWP may be used for a first WTRU category and a second maximum number of RBs, PRBs, or virtual RBs for a BWP may be used for a second WTRU category. The maximum number of BWPs configurable for a WTRU in a carrier may be determined based on the WTRU category.

One or more BWP types may be configured, used, or determined. Specifically, a BWP type may be determined based on a traffic type. For example, a first BWP type may be used, configured, or determined for a first traffic type (e.g., eMBB) and a second BWP type may be used, configured, or determined for a second traffic type (e.g., URLLC). A WTRU may send a scheduling request in a corresponding uplink BWP based on the traffic type. For example, when a WTRU has data for a first traffic type, the WTRU may send a scheduling request in an uplink BWP which may be determined, configured, or used as a first BWP type. If a WTRU is on an active BWP and its BWP type is different from the traffic type for the scheduling request, the WTRU may switch to the corresponding BWP based on priority rule.

In an example, a BWP type may be determined based on a BWP identity, a BWP index, and/or a BWP number. For example, a BWP with a lowest BWP index (e.g., 0) in a carrier may be considered, determined, or used as a first type of BWP and the remaining BWPs configured in a carrier may be considered, determined, or used as a second type of BWP. The first type of BWP may be referred to as a default BWP, an initial active BWP, or a fallback BWP.

In an example, a BWP type may be determined based on numerology (e.g., SCS). The bandwidth of a BWP may determine the BWP type. For example, if a number of RB for a BWP is greater than a threshold, the BWP may be determined as a first BWP type. A downlink control channel search space may be configured, used, or determined based on the BWP type. For example, a first search space (e.g., search space for monitoring DCI with a first radio network temporary identifier (RNTI)) may be located in a first BWP type and a second search space (e.g., search space for monitoring DCI with a second RNTI) may be located in a second BWP type.

A transmission scheme or mode may be determined based on a bandwidth of a BWP or a BWP type. For example, a first transmission scheme may be used for a first BWP type and a second transmission scheme may be used for a second BWP type, and the first and/or second BWP types may be determined based on the bandwidth.

CSI reporting may be configured for inter-BWP measurement. In an example, aperiodic CSI reporting, periodic CSI reporting, and/or semi-persistent CSI reporting may be used or configured for the measurement of one or more non-active BWPs. One or more CSI reporting settings (or reporting settings) may be used, configured, or indicated for a non-active BWP measurement. The CSI reporting setting may be associated with a single non-active BWP, and a WTRU may be configured with one or more CSI reporting settings for the measurement of one or more non-active BWPs. Each CSI reporting setting for non-active BWP(s) may be triggered or configured independently. A CSI reporting setting may be independent from a BWP. An associated resource setting may be associated with a single non-active BWP. A CSI reporting setting may be linked with an active BWP or a non-active BWP. If the CSI reporting setting is linked with a non-active BWP, the CSI reporting may be an inter-BWP measurement.

One or more of CSI reporting types may be used for inter-BWP measurement. The CSI reporting types may include, but are not limited to, any of the following CSI reporting types: a strongest BWP indicator (SBI); a required measurement timer window (rMTW); a CSI reporting periodicity type; and/or a low BWP indicator (LBI). The SBI may also be referred to as a preferred BWP indicator (PBI), a BWP indicator (BI), or a selected BWP indicator. The SBI may be used to indicate a BWP identity that may has a highest measurement result (e.g., L1-RSRP, CQI, averaged L1-RSRP, or wideband CQI) or that may be a BWP selected by a WTRU for the BWP switch (e.g., the BWP preferred by the WTRU for the BWP switch). The SBI may include one or more BWP identities (e.g., the N BWPs having a highest measurement value). The SBI may be a set of BWP identities for which the measurement result is above a threshold. For example, the threshold may be configured, predefined, or determined based on the measurement result of a current active BWP.

For the rMTW, a set of candidate values may be configured, predetermined, or used and a WTRU may indicate or report a candidate value within the set as the selected rMTW. The rMTW at a WTRU may be determined based on channel condition, mobility, and/or WTRU capability. For the CSI reporting periodicity type, one or more CSI reporting periodicity types may be used. The CSI reporting periodicity type may be implicitly determined based on a status of a BWP (e.g., active, non-active, default, or initial active). The CSI reporting periodicity may also be referred to as a measurement reporting periodicity. For the LBI, a WTRU may report or indicate one or more BWPs if the one or more BWPs has a measurement below a threshold. For example, a WTRU may perform measurements for non-active BWPs during a measurement gap. The WTRU may indicate one or more non-active BWPs as a low BWP if the (e.g., L1-RSRP) measurement for the one or more non-active BWPs is below a threshold. A WTRU may skip reporting measurement results for the non-active BWPs that are indicated as low BWP. The WTRU may report measurement results for non-active BWPs that may have measurement results above the threshold and are not indicated as low BWP.

A measurement timer may be used for CSI measurement. For example, a measurement timer may be used to determine when a measurement report or a reported measurement report becomes valid. A WTRU may not (or may not need to) perform the corresponding measurement unless the measurement timer is expired (or is running). The WTRU may perform the corresponding measurement when the measurement timer is expired (or is no longer running). As used herein, the measurement timer may be used interchangeably with a timer, a CSI measurement timer, a CSI time window, a measurement time window, a measurement timer value, and/or a measurement validity (or measurement prohibit) time length. The measurement timer may be used for performing measurements on a channel and may include, but is not limited to, RLM, RRM, CSI, positioning, and/or L1-RSRP of SSB.

In an example, a measurement timer for CSI measurement may be counted or adjusted (e.g., started, stopped, incremented, or decremented) at a slot level, a subframe level, a symbol level, or a radio frame level. The measurement timer may be configured per measurement. For example, one or more CSI reporting settings may be configured and each CSI reporting setting may be configured with a different measurement timer. In another example, one or more CSI reporting settings may be configured and a measurement timer may be used for a subset of the configured CSI reporting settings. A measurement timer may be configured independently from a CSI reporting periodicity if it is used for periodic or semi-persistent CSI reporting. A measurement timer may be configured as an integer multiple of a CSI reporting periodicity when the CSI reporting is based on periodic or semi-persistent reporting.

A measurement timer may be used based on a measurement type. For example, a measurement timer may be used for a first measurement type (e.g., L1-RSRP) while the measurement timer may not be used for one or more (e.g., all) other measurement types (e.g., RRM). A status may be applied to the measurement timer, such as any of the following example status. For reset status, the measurement timer may be reset to an initial value (e.g., 0). For start or started status, the measurement timer or the counter of the measurement timer may start from an initial value (e.g., 0). For stop or stopped status, the measurement timer or the counter of the measurement timer may be on hold. For restart, restarted, resume, or resumed status, the measurement timer or the counter of the measurement timer may resume or may be able to be adjusted. For extended status, the maximum number or a target number may be increased. For expired status, the measurement timer or the counter of the measurement timer may have reached a maximum number (or a target number).

One or more types of measurement timers may be used based on a measurement type. In an example, the first type of a measurement timer may include a first set of statuses (e.g., start, reset, and expired). The second type of a measurement timer may include a second set of statuses (e.g., start, stop, resume, and expired). The third type of a measurement timer may include all possible statuses. The first type of a measurement timer may be used for a first measurement type (e.g., RLM measurement). The second type of a measurement timer may be used for a second measurement type (e.g., CSI measurement for active BWP). The third type of a measurement timer may be used for a third measurement type (e.g., CSI measurement for non-active BWP).

A measurement (e.g., CSI measurement) based on a periodic or a semi-persistent CSI reporting for one or more target BWPs (e.g., a set of non-active BWPs which may be indicated for a measurement) may be performed based on a measurement timer. For example, a measurement timer may be configured for a CSI measurement associated with one or more target BWPs. If the measurement timer is expired at a time instance for the corresponding CSI measurement and/or CSI reporting, the WTRU may perform the CSI measurement for the target BWP(s). If the measurement timer is not expired, the WTRU may skip measurement and/or report the corresponding CSI.

Figure 5:
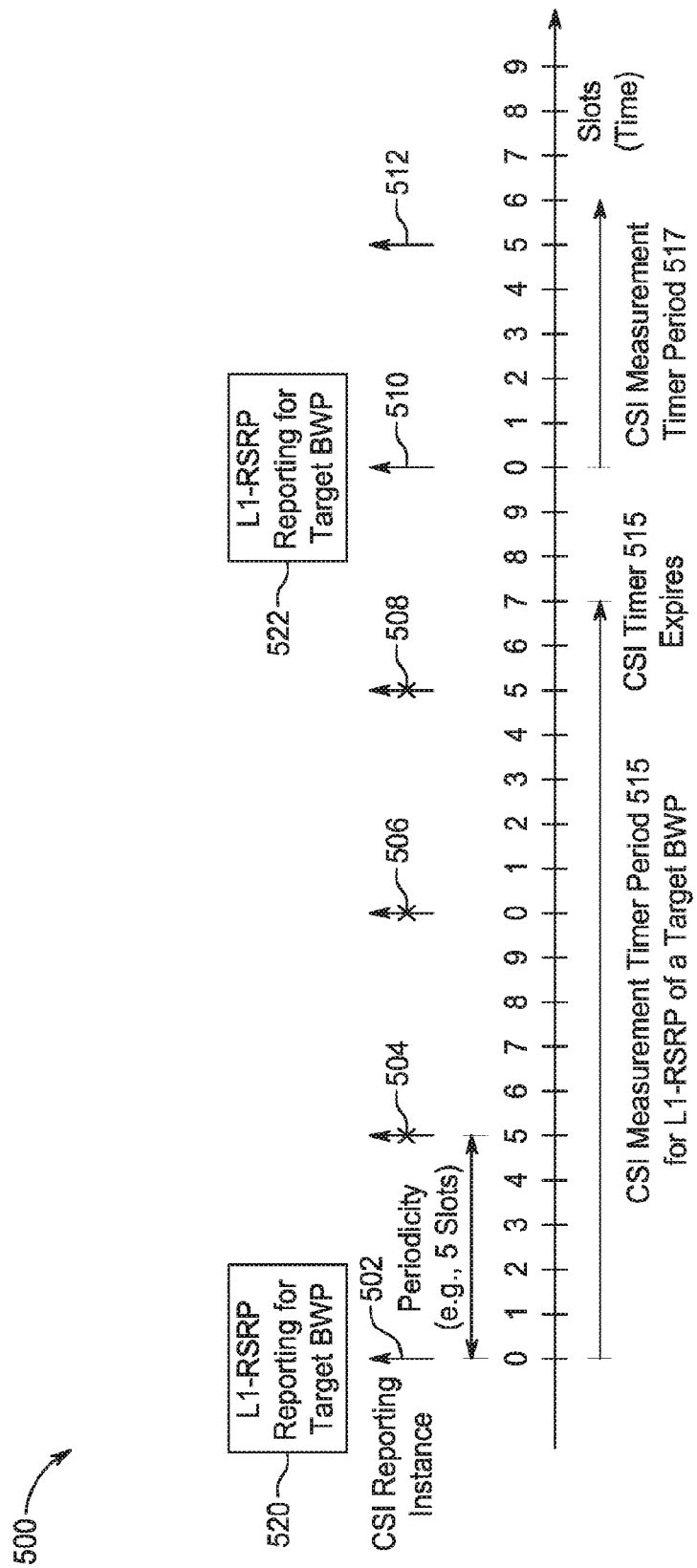
FIG. 5 is a timing diagram of an example procedure for periodic CSI reporting for a target BWP based on a measurement timer.

FIG. 5 is a timing diagram of an example procedure 500 for periodic CSI reporting for a target BWP based on a measurement timer. According to the example in FIG. 5, CSI reporting instances (e.g., 502, 504, 506, 508, 510, 512 etc.) may be periodic (e.g., with a periodicity of 5 slots). The WTRU may skip CSI measurement (e.g., L1-RSRP) reporting for the target BWP at CSI reporting instances during the time or period(s) that the CSI measurement timer is running. The WTRU may perform CSI measurement reporting for the target BWP at CSI reporting instances if the CSI measurement timer is not running (e.g., timer is expired). For example, CSI reporting instances 504, 506, and 508 occur during the CSI measurement timer period (window) 515, and therefore the WTRU does not send measurement reporting for the target BWP at CSI reporting instances 504, 506, and 508. The WTRU may send CSI measurement (e.g., L1-RSRP) reporting 520 and 522 at CSI reporting instances 502 and 510, respectively, which are outside (or at the boundary of) the measurement timer periods 515 and 517 for L1-RSRP of the target BWP.

A measurement timer may be a validity timer. For example, a measurement timer for a measurement (e.g., CSI measurement) may indicate if the measurement is still valid in which case the WTRU may not need to update the measurement. A measurement timer window (or the length of measurement timer) may be determined based on the measurement reporting type. For example, first measurement timer window (e.g., 0) may be used for aperiodic CSI reporting type. A second measurement timer window (e.g., long) may be used for periodic CSI reporting type. A third measurement timer window (e.g., short) may be used for semi-persistent CSI reporting type.

A measurement timer for a measurement associated with a target BWP may start (or resume) based on one or more of following example scenarios. In an example scenario, when a WTRU reports a corresponding CSI measurement in a slot (e.g., uplink slot #n), the measurement timer may start from the slot (e.g., slot #n) or from the slot with a slot offset (e.g., slot #n+offset), wherein the slot #n may be referred to as a time reference. If a set of slots are used for a measurement reporting, the first or the last slot of the set of slots may be used as a time reference of measurement timer start. In another example scenario, when a WTRU finishes the corresponding measurement in a slot, the measurement timer may start from the slot where the corresponding measurement was performed. In another example, the slot containing a downlink signal associated with the measurement may be a time reference for the CSI measurement timer. If a set of slots are used for a measurement, the first or the last slot of the set of slots may be used as a time reference of the measurement timer to start.

In another example scenario, a WTRU may start or restart a measurement timer when a measurement of the current active BWP is below a threshold. For example, when L1-RSRP of a DL-RS in the current active BWP is below a threshold, the measurement timer may be started (or restarted). The measurement timer window may have the value 0, in which case a WTRU may immediately start a measurement procedure for a non-active BWP when a measurement of a current active BWP is below threshold. If the measurement timer window has value greater than 0, the WTRU may wait until the measurement timer expires to perform the non-active BWP measurement. The threshold values described herein may be preconfigured, predefined, or indicated.

A measurement timer for a measurement associated with a target BWP may be stopped (e.g., by the WTRU) when any one or more of following example conditions are met. An example condition may include when a target BWP becomes an active BWP. In this case, a (or any) measurement in an active BWP may be reported without using a measurement timer since no measurement gap may be needed. A measurement in an active BWP may be a measurement associated with a downlink signal located in the active BWP. Another example condition may include when a target BWP is fully or partially overlapped with an active BWP in frequency domain. For example, if a target BWP is a part of an active BWP, the measurement for the target BWP may be obtained from a measurement for an active BWP. Another example condition may include when a target BWP is fully or partially overlapped with another target BWP, a measurement may be reported for another target BWP. Another example condition may include when the measurement of an active BWP is above a threshold, such that the threshold value may (or may not) be different across BWPs. Another example condition may include when a WTRU is located in a default BWP. In this case, if the WTRU is in a default BWP, the measurement timer for non-active BWPs may be stopped and the WTRU may not need to report measurements for the non-active BWPs. Another example condition may include when a WTRU is in a connected mode discontinuous reception (DRX) period.

A measurement timer for a measurement associated with a target BWP may be reset (e.g., by the WTRU) when any one or more of following example conditions are met. An example condition may include a target BWP becoming an active BWP. An example condition may include a target BWP is fully or partially overlapped with an active BWP. An example condition may include a target BWP is fully or partially overlapped with another target BWP for which a measurement may be reported. An example condition may include a measurement of the target BWP may be reported.

A measurement timer window (i.e., measurement timer length or duration) for a measurement may be determined based on any one or more of the following example parameters. Example parameters may include the unit of slot (e.g., 20 slots), the unit of time sample (e.g., 1000 samples), the unit of OFDM symbols (e.g., 140 symbols), and/or the unit of absolute time (e.g., 20 ms). An example parameter may include the numerology of a target BWP. For example, a longer measurement timer window may be used for a smaller SCS (e.g., 15 kHz) and a shorter measurement timer window may be used for a larger SCS (e.g., 60 kHz), or vice-versa. An example parameter may include the numerology of an active BWP. For example, the numerology gap between an active BWP and a target BWP may be used to determine the measurement timer window. An example parameter may include a periodicity of the downlink signal for the measurement in a target BWP. For example, if a DL RS for the measurement in a target BWP is transmitted with a first periodicity (e.g., 20 ms), the measurement timer window may be determined as having a first value (e.g., 100 ms). If a downlink (DL) reference signal (RS) for the measurement in a target BWP is transmitted with a second periodicity (e.g., 40 ms), the measurement timer window may be determined as having a second value (e.g., 200 ms). In an example, the measurement timer window may be an integer multiple of the periodicity of a DL RS for the measurement.

An example parameter that may be used to determine the measurement time window may include a BWP identity. Another example parameter may include WTRU mobility (e.g., Doppler frequency). For example, a WTRU may determine the measurement timer window based on the estimated or measured WTRU mobility value (e.g., Doppler frequency). An example parameter may include a frequency range. For example, a first measurement timer window may be used for a first frequency range (e.g., below 6 GHz) and a second measurement timer window may be used for a second frequency range (e.g., above 6 GHz). A measurement timer window for a measurement may be indicated via a higher layer signaling (e.g., radio resource control (RRC) signaling or a medium access control (MAC) control element (MAC-CE)). For example, a semi-persistent CSI measurement (or CSI reporting) may be triggered via a MAC-CE, such that the triggering message (MAC-CE) may include the measurement timer window value.

One or more types of CSI reporting periodicity (e.g., multi-type CSI reporting periodicity) may be used, configured, or determined for a CSI reporting setting. In an example, the first type of CSI reporting periodicity may be used, or activated when the CSI reporting is for an active BWP. The second type of CSI reporting periodicity may be used, or activated when the CSI reporting is for a non-active BWP. The CSI reporting setting may include a report configuration type (e.g., ReportConfigType), which may indicate a time domain behavior (e.g., periodic, aperiodic, or semi-persistent) and/or a periodicity of the reporting when the time domain behavior is periodic or semi-persistent. In an example, two types of CSI reporting periodicity may be configured when the time domain behavior is periodic or semi-persistent (e.g., two values of CSI reporting periodicity). A first value may be used (e.g., by a WTRU) when the WTRU reports a CSI reporting setting that may be linked with a resource setting that corresponds to an active BWP. A second value may be used (e.g., by a WTRU) when the WTRU reports a CSI reporting setting that may be linked with a resource setting corresponds to a non-active BWP.

The number of CSI reporting periodicity types may be determined based on BWP types. For example, a single CSI reporting periodicity type may be used, configured, or determined for a first type of BWP (e.g., default BWP). In an example, two CSI reporting periodicity types may be used, configured, or determined for a second type of BWP (e.g., not default BWP). A WTRU may not be requested for a measurement for a non-active BWP if the WTRU is active in a default BWP. A WTRU may not measure and/or may not report a measurement for non-active BWP if the WTRU is active in a default BWP.

In another example of multi-type CSI reporting periodicity, a CSI reporting setting for a first CSI reporting periodicity type (e.g., for an active BWP) may be reported in each periodicity (e.g., in the slot for the CSI reporting). A CSI reporting setting for a second CSI reporting periodicity type (e.g., for a non-active BWP) may be reported in each periodicity when a measurement timer for the non-active BWP may be expired or when a WTRU may not be active in the default BWP. The CSI reporting setting for a second CSI reporting periodicity type (e.g., for non-active BWP) may also be reported in each periodicity when the measurement of a current active BWP goes below (or above) a threshold. For example, when a wideband CQI for the active BWP is below (or above) a threshold, the CSI reporting setting for a second CSI reporting periodicity type may be reported. Because the channel condition for the active BWP may be reliable considered when the measurement of the active BWP is above a threshold, a WTRU may not measure CSI for the non-active BWP. The value for a second CSI reporting periodicity type may be an integer multiple of a first CSI reporting periodicity.

In another example of CSI reporting periodicity, a CSI reporting periodicity may be configured with a value that may be determined based on the linked resource setting type. For example, the configured value of the (as is) CSI reporting periodicity may be used if the linked resource setting is in the active BWP. The configured value of the CSI reporting periodicity may be updated if the linked resource setting is associated with a non-active BWP. The configured value of the CSI reporting periodicity may be updated as integer multiples of the configured periodicity value if the linked resource setting is associated with a non-active BWP. The integer value may be predefined (e.g., 10). The configured value of the (as is) CSI reporting periodicity may be used if the linked resource setting is associated with a default BWP.

When multiple CSI reporting settings may be (or may need to be) reported in a same slot, one or more of the following example priority rules may apply. According to an example priority rule, CSI reporting types for an active BWP may be a higher priority than CSI reporting types for a non-active BWP. For example, when a WTRU may (or may need or intend to) report a CSI reporting setting for an active BWP and a CSI reporting setting for a non-active BWP, the WTRU may drop the CSI reporting setting for the non-active BWP. According to another example priority rule, the CSI reporting types for a default BWP may be a higher priority than CSI reporting types for other BWPs (e.g., active BWP or non-active BWPs).

BWP expansion may be employed as part of BWP operation. In an example, one or more BWPs may be configured and one of the configured BWPs may be overlapped with all other BWPs in frequency. For example, at least one of the configured BWP may be wideband (e.g., having the same or close to the same bandwidth as the same as carrier bandwidth). The BWP which may be overlapped with all other BWPs in frequency may be referred to as a wideband BWP, a reference BWP, or a CSI BWP. A subband of the wideband BWP for a CSI reporting may be determined based on BWP status. In an example, a first subband size may be used when the wideband BWP is an active BWP and a second subband size may be used when the wideband BWP is a non-active BWP. The first subband size may be a single bandwidth (e.g., in terms of the number of RBs) for all subbands within the BWP. The second subband size may be multiple bandwidths and each subband may correspond to a BWP. For example, a first subband may be aligned with a first BWP, and a second subband may be aligned with a second BWP. Similarly, an $n^{th}$ subband may be aligned with an $n^{th}$ BWP. The support of a wideband BWP may be based on WTRU capability.

When a WTRU is indicated or configured to measure CSI for a wideband BWP that may be overlapped with the current active BWP in frequency, any one or more following example procedures may be applied. If the wideband BWP is a non-active BWP, the WTRU may monitor CORESETs configured for the active BWP while measuring CSI in wideband BWP for the CSI measurement. When a WTRU is in a wideband BWP for data transmission/reception, CORESETs configured for the wideband BWP may be monitored. When a WTRU is in a wideband BWP for the CSI measurement (e.g., for inter-BWP measurement), CORESETs configured for the active BWP may be monitored. In another example, CORESETs configured for the wideband BWP may be monitored, but the DCI format, types, and search spaces may be the same as in the active BWP.

In an example, a WTRU may be indicated or configured to measure CSI for one or more non-active BWPs and the WTRU may expand the bandwidth of current active BWP to include the non-active BWPs for the CSI measurement. The bandwidth expansion may be allowed for (or limited to) the non-active BWPs that have the same numerologies (e.g., SCS or CP length) as the active BWP. The bandwidth expansion may be allowed for (or limited to) the non-active BWPs that are located within a certain frequency distance. For example, a non-active BWP that is located within X MHz (e.g., 10 MHz) from the current active BWP may be included in the bandwidth expansion. The bandwidth expansion may (or may not) be used without measurement gap. The use of bandwidth expansion for a target BWP measurement or BWP switch with a measurement gap may be determined based on WTRU capability and/or WTRU category.

Flexible measurement gaps may be used for CSI measurement of non-active BWPs. A CSI reporting may be triggered, configured, or indicated to measure and/or report CSI for one or more (e.g., non-active) target BWPs for a WTRU. The target BWP may be one of the configured BWPs for the WTRU and may be different from the current active BWP. A WTRU may be indicated, triggered, or configured to measure a CSI in one or more target BWP. A measurement gap may be used, configured, or determined for a (CSI measurement) time window during which the WTRU may measure a CSI in one or more target BWP(s).

The measurement gap may be a time window (i.e., start time and/or time period, time duration, window length) in the unit of samples, OFDM symbols, slots, subframes, or frame, for example. For example, a measurement gap may be defined in terms of number of slots. A WTRU may be allowed to skip or skip monitoring one or more CORESETs configured for the current active BWP. As used herein, the measurement gap may be interchangeably used with inter-BWP measurement gap, retuning time, measurement gap value, frequency switching time, measurement window, CSI measurement window, inter-BWP access time, a measurement gap window length, or measurement time. As disclosed herein, a measurement gap (i.e., measurement gap value or window length) may be determined based on any one or more of the following example parameters: numerology (e.g., SCS and/or CP length) of a target BWP; numerology of an active BWP and a target BWP; periodicity of a measurement signal in a target BWP; CSI reporting type for a target BWP; BWP index of a target BWP; CSI reporting type for a target BWP; the number of target BWPs; bandwidth of a target BWP; and/or WTRU bandwidth capability.

For example, a measurement gap value may be determined based on numerology (e.g., SCS and/or (cyclic prefix) CP length) of the target BWP. In an example, a first measurement gap value may be used if the target BWP has the same numerology as the active BWP and/or a second measurement gap value may be used if the target BWP has a different numerology with the active BWP. The second measurement gap value may be different based on whether the SCS for a target BWP is larger than the SCS of the active BWP or smaller than the SCS of the active BWP. A larger measurement gap may be used when the SCS of a target BWP is smaller than that of active BWP. Table 2 shows an example of measurement gap values based on the numerologies of an active BWP and a target BWP. When more than one target BWP may need to be measured and a single measurement gap is used, the measurement gap value may be determined based on the numerology of an active BWP and a target BWP that has the smallest SCS (or a largest subcarrier spacing).

TABLE 2

An example of measurement gap values
for a target BWP based on numerology

| Active BWP BW | Target BWP BW | Measurement gap value (in number of slots) |
| --- | --- | --- |
| 15 kHz | 30 kHz | 4 |
| 30 kHz | 30 kHz | 8 |
| 60 kHz | 30 kHz | 12 |
| 120 kHz | 30 kHz | 24 |

Figure 6:
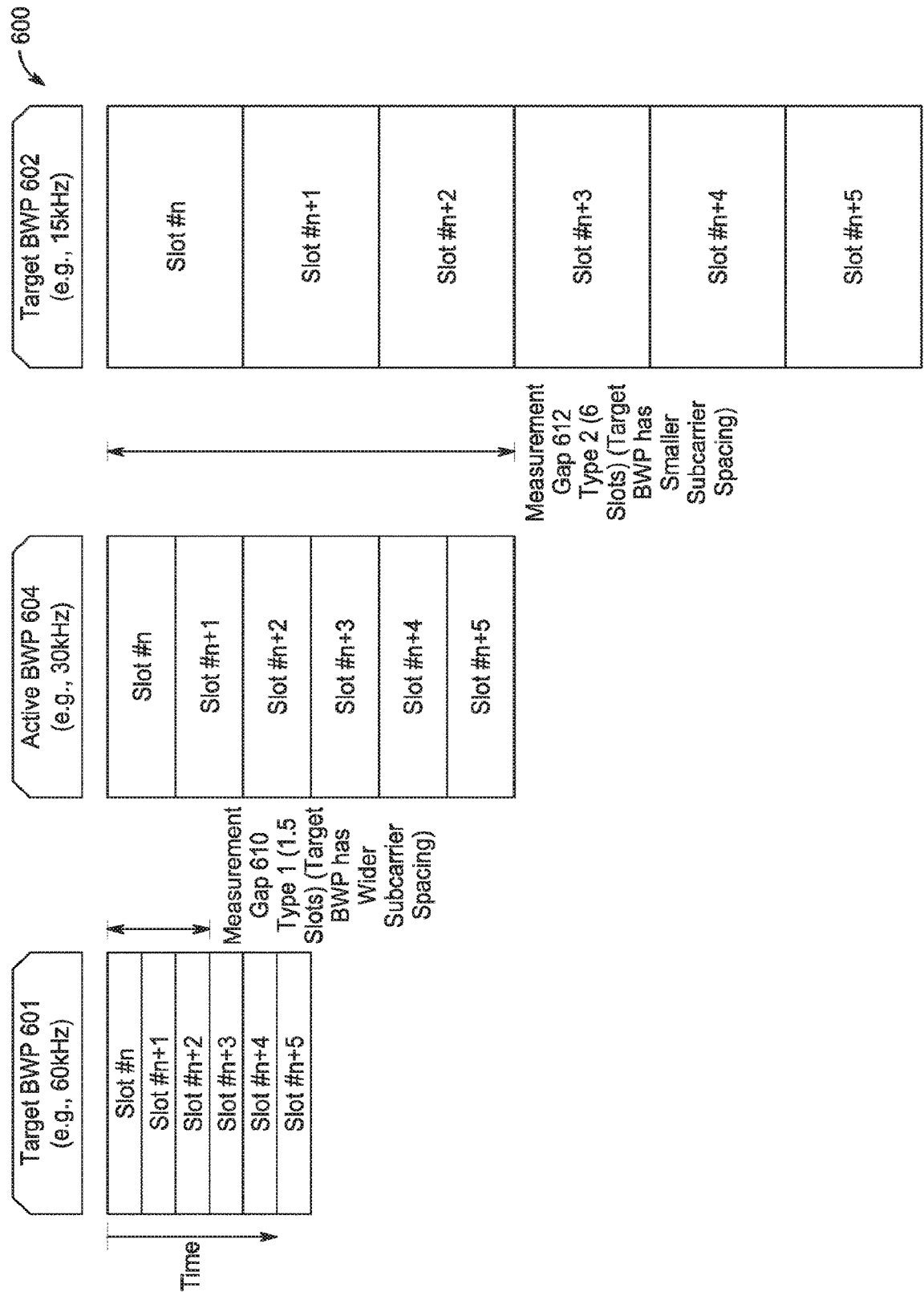
FIG. 6 is a resource diagram of an example measurement gap assignment.

FIG. 6 is a resource diagram of an example measurement gap assignment 600. In the example of FIG. 6, the measurement gap values are based on numerology of the respective target BWPs. The BWPs configured for a WTRU in the example of FIG. 6 include an active BWP 604 (e.g., bandwidth of 30 kHz), a target BWP 601 (e.g., bandwidth of 60 kHz) and another target BWP 602 (e.g., bandwidth of 15 KHz), each with different bandwidths. Because the target BWP 602 has a smaller SCS than the active BWP 604, and target BWP 601 has a larger SCS than the active BWP 604, then the measurement gap 610 for target BWP 602 is larger than the measurement gap 612 (e.g., 6 slots) for target BWP 601.

Figure 7:
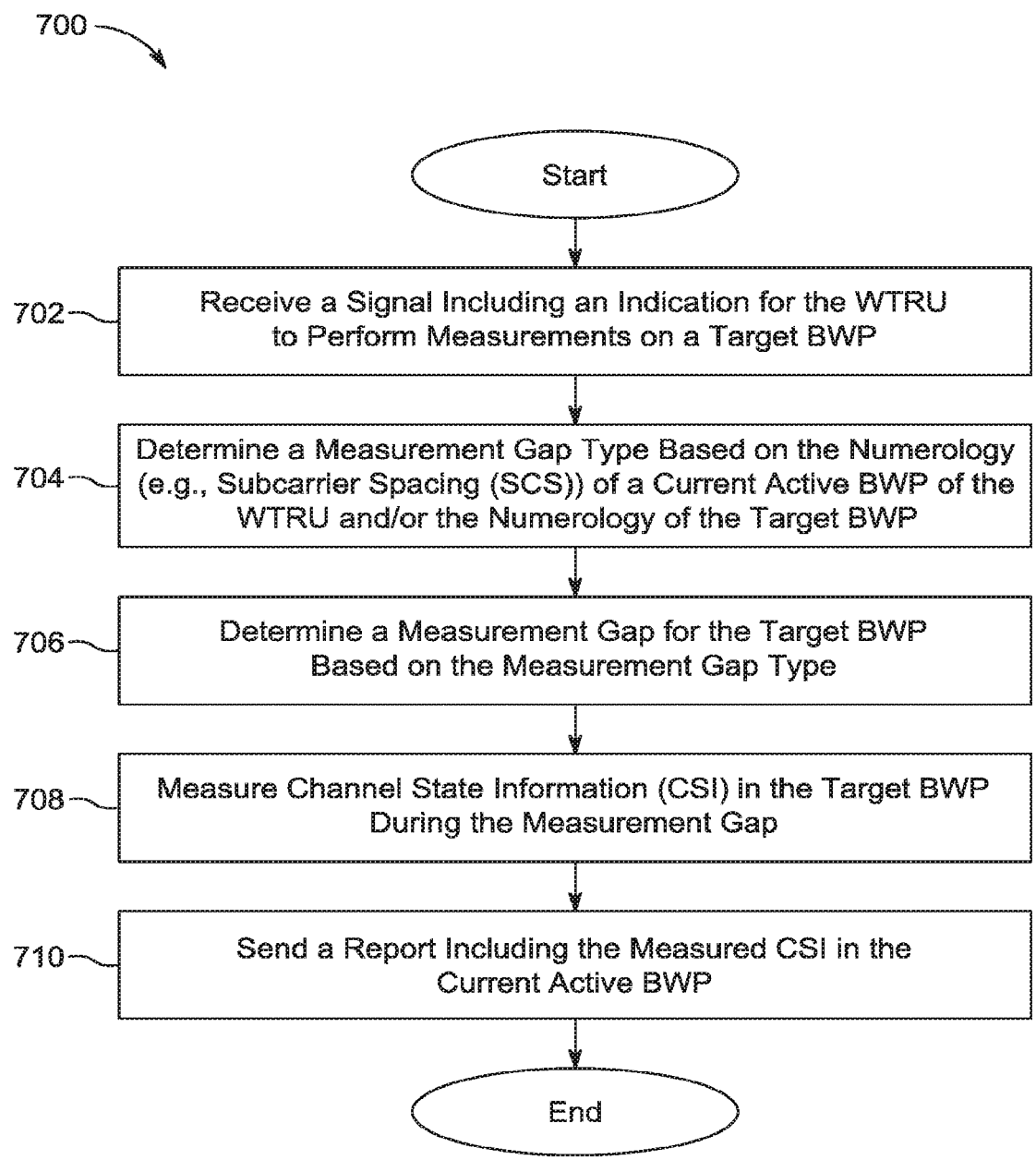
FIG. 7 is a flow diagram of an example CSI measurement procedure for a target BWP that may be performed by a WTRU.

In an example, a measurement gap type (for CSI measurement) may be determined for a target BWP (e.g., based on the numerology of the current active BWP and/or the numerology the target BWP), such that each measurement gap type has an associated measurement gap value (length, duration) that may be used for the measurement gap of the target BWP. FIG. 7 is a flow diagram of an example CSI measurement procedure 700 for a target BWP that may be performed by a WTRU. In the example of FIG. 7, the measurement gap value is based on the numerology of the target BWP. The target BWP may be an inactive BWP. At 702, the WTRU may receive a signal including an indication for the WTRU to perform measurements on a target BWP. At 704, the WTRU may determine a measurement gap type based on at least one of the numerology (e.g., subcarrier spacing (SCS)) of a current active BWP of the WTRU and/or the numerology of the target BWP. At 706, the WTRU may determine a measurement gap for the target BWP based on the measurement gap type. At 708, the WTRU may measure CSI in the target BWP during the measurement gap. At 710, the WTRU may send a report including the measured CSI in the current active BWP.

In another example, a measurement gap value may be determined based on a periodicity of measurement signal in a target BWP. For example, a first measurement gap value may be used if the measurement signal in a target BWP is a first value (e.g., ×1 ms) and a second measurement gap value may be used if the measurement signal in a target BWP is a second value (e.g., ×2 ms). A measurement gap value may be determined based on a BWP index of a target BWP. A measurement gap value may be determined based on CSI reporting type for a target BWP. For example, a first measurement gap value may be used if a first CSI reporting type (e.g., L1-RSRP) needs to be measured in the target BWP and a second measurement gap value may be used if a second CSI reporting type (e.g., CSI-RS resource indicator (CRI)) needs to be measured in the target BWP. A shorter measurement gap may be used if the measurement for a target BWP is based on a single DL reference signal (e.g., a single CSI-RS resource). A longer measurement gap may be used if the measurement for a target BWP is based on multiple DL reference signals (e.g., multiple CSI-RS resources), which may be used, for example, for beam search, beam pairing, and/or multiple transmission and reception point (TRP) operation. In an example, the measurement gap value may be indicated when aperiodic CSI reporting is triggered for a target BWP.

In another example, a measurement gap value may be determined based on WTRU bandwidth capability. For example, a first measurement gap value (e.g., 10 slots) may be used for a WTRU with narrow band capability (e.g., 5 MHz); a second measurement gap value (e.g., 5 slots) may be used for a WTRU with medium bandwidth capability (e.g., 20 MHz); and a third measurement gap value (e.g., 0 slot) may be used for a WTRU with wideband capability. A measurement gap value have a value of 0, which may be considered or interpreted as the WTRU having no measurement gap.

A WTRU may receive an indication to measure CSI of one or more target BWPs via a DCI (e.g., the DCI may be used for an uplink grant for PUSCH or a downlink assignment for PDSCH). A measurement of one or more target BWPs (e.g., inter-BWP measurement) for CSI reporting may be activated or deactivated via higher layer signaling. The DCI may include a CSI request field to trigger aperiodic CSI (A-CSI) reporting and the CSI request field may include one or more CSI triggering states, such that each CSI triggering state may be associated with a reporting setting (e.g., ReportConfig). Each CSI triggering state may include an associated BWP identity (e.g., BWP-info), for example in the case that inter-BWP measurement is activated. The associated resource settings for a CSI triggering state may have the same BWP identity. For example, a WTRU may not expect a configuration where a BWP-identity is different between the CSI triggering state and the associated resource settings. Each reporting setting may include an associated BWP identity and the associated resource settings for a reporting setting may have the same BWP identity. Each resource setting may include an associated BWP identity. When a WTRU is triggered to report A-CSI and the associated resource setting for the CSI triggering state has BWP identity that is different from current active BWP, the WTRU may measure the target BWP associated with the resource setting. If inter-BWP measurement is deactivated, a WTRU may not expect that a CSI request field associated with a BWP (which is different from the current active BWP) is triggered. Table 3 shows an example of BWP identities (e.g., BWP-info values) corresponding to CSI request field values.

TABLE 3

Example of BWP-info for different CSI request field values

| CSI request field | Field for reporting settings | Field for resource settings | BWP-info |
|---|---|---|---|
| 00 | Reporting setting 1 | Resource setting 1 | 1 |
| 01 | Reporting setting 1 | Resource setting 2 | 2 |

TABLE 3-continued

Example of BWP-info for different CSI request field values

| CSI request field | Field for reporting settings | Field for resource settings | BWP-info |
|---|---|---|---|
| 10 | Reporting setting 2 | Resource setting 1 | 1 |
| 11 | Reporting setting 3 | Resource setting 3 | 1 |

In another example, a WTRU may request inter-BWP measurement when one or more predefined conditions are met. An uplink signal may be reserved to indicate, report, or trigger the inter-BWP measurement request. For example, a PRACH resource, scheduling request resource, or PUCCH resource may be reserved for the request of inter-BWP measurement. Examples of predefined conditions for the WTRU to request inter-BWP measurement may include and one or more of the following conditions: a RSRP (e.g., L1-RSRP) of a DL RS in the current active BWP is below a threshold; and/or a hypothetical block error rate (BLER) of one or more serving CORESETs in the current active BWP is below a threshold.

Mechanisms may be used to switch the active BWP (i.e., perform a BWP switch). Semi-persistent CSI reporting and/or semi-persistent CSI-RS transmission may be activated via a DCI, such that the DCI may be used to activate and/or deactivate the semi-persistent CSI reporting and/or the semi-persistent CSI-RS transmission. A WTRU may be indicated to activate a semi-persistent CSI reporting in an active BWP. The WTRU may be indicated to switch to another BWP or the WTRU may be switched to a default BWP due to an inactivity timer expiring without deactivation of the semi-persistent CSI reporting. In this case, one or more of following example scenarios may apply. In an example scenario, a WTRU may assume the semi-persistent CSI reporting and/or the semi-persistent CSI-RS may be deactivated when the WTRU switched to another BWP (or a default BWP). In another example scenario, the WTRU may assume the semi-persistent CSI reporting and/or the semi-persistent CSI-RS transmission may be still valid if the WTRU is configured, indicated, or required to perform inter-BWP measurement. Otherwise, the WTRU may assume that the semi-persistent CSI reporting and/or CSI-RS transmission may be deactivated. In another example scenario, a WTRU may assume the semi-persistent CSI reporting and/or CSI-RS may be still valid if the WTRU is switched to another BWP by an indication from a DCI. The WTRU may assume the semi-persistent CSI reporting and/ or CSI-RS may be deactivated if the WTRU is switched to a default BWP due to BWP inactivity timer expired.

In an example, a WTRU may switch to a default BWP if a measurement timer is expired for a CSI measurement associated with the default BWP, whether or not the inactivity timer is expired. A CSI measurement for a default BWP may be configured with a measurement timer. If the measurement timer of the CSI measurement for a default BWP expires, the WTRU may switch to the default BWP for the CSI measurement.

Spatial QCL may be associated with BWPs. A WTRU may be configured with one or more downlink beams and each downlink beam may be represented as a downlink signal (e.g., SS/PBCH block, a CSI-RS resource, or DM-RS port). A beam-specific downlink signal may be configured, transmitted, or received per BWP. In this case, a WTRU in an active BWP may not be able to measure QCL parameters on a beam-specific downlink signal transmitted in a non-active BWP, which may be a problem for the WTRU if the WTRU needs to use the QCL parameters for its PDSCH or PDCCH reception.

Due to outdated measurements of QCL parameters, the demodulation performance of a downlink signal (e.g., PDCCH or PDSCH) may be degraded significantly. In addition, a WTRU may not be able to measure beam quality for a beam-specific downlink signal which may be transmitted in a non-active BWP. Thus, the maintenance of the beams for downlink and uplink transmission may not be properly controlled.

In an example, a common DL signal across configured BWPs may be used. For example, a DL signal may be used commonly across configured BWPs may, where the DL signal may be transmitted over the carrier and each BWP may include a part of the DL signal. The DL signal may be configured, transmitted, or used when all configured BWPs have the same numerology (e.g., SCS and/or CP length). Numerology of time locations where the DL signal may be transmitted for the configured BWPs may have the same numerology while numerology of the other time locations for the configured BWPs may use the configured numerology of each respective BWP. All DL signals associated with beams for the BWP may be located in the same BWP. One or more transmission configuration indication (TCI) states associated with DL signals, which may be transmitted in non-active BWP, may not be used in an active BWP. A TCI state may be associated with a DL signal and the DL signal may be determined based on BWP index of the active BWP. A QCL parameter measurement with a measurement gap may be used, wherein the measurement gap may be determined based on QCL types.

A PDCCH may be associated with multiple BWPs. One or more CORESETs may be configured per BWP, and each CORESET may be associated with a downlink beam (i.e., a DL signal). For example, each CORESET configuration may include a TCI state (e.g., TCI-StatesPDCCH) which may provide a QCL relationship between the DL RS(s) on a RS set (e.g., TCI-RS-SetConfig) and the PDCCH DMRS ports. The TCI state for a CORESET may be associated with a DL RS (e.g., SSB, CSI-RS, non-zero power CSI-RS (NZP-CSI-RS), TRS, phase tracking reference signal (PTRS)) and the DL RS may be located in a non-active BWP.

In an example, the DL RS(s) for the TCI state configured, indicated, or used for a CORESET may be transmitted in the same BWP. In this case, a WTRU may assume that the DL RS(s) for a TCI state configured or used for a CORESET may be in the same BWP and the WTRU may not need to measure DL RSs in a non-active BWP. Each BWP may include all DL RS(s) that are associated with one or more TCI states. A set of TCI states and associated DL RSs may be configured via higher layer signaling and one of the configured TCI states may be determined for a CORESET, such that the set of TCI states and associated DL RSs may be configured per BWP, per CORESET, or per carrier. CORESETs in the same BWP may use the same set of TCI states, and a determined TCI state for each CORESET may be different (e.g., A TCI state within the set of TCI states for a CORESET may be individually configured).

When a WTRU is switched from a BWP to another (e.g., from an active BWP to a target BWP), a gap may be used, determined, or configured and a WTRU may acquire QCL parameters in the target BWP during the gap for PDCCH and/or PDSCH reception. The gap may be referred to as a QCL measurement gap, a QCL gap, a retuning gap, a frequency retuning gap, and a beam pairing gap. The QCL gap length may be defined or determined in units of slots, OFDM symbols, time samples, subframes, or radio frames. The QCL gap may be determined based on WTRU capability. For example, if a WTRU has wideband reception capability (e.g., the WTRU may receive one or more BWPs at the same time), the QCL gap may be 0 or a small value; if a WTRU has limited bandwidth capability (e.g., the WTRU may receive a single BWP at a time and a maximum bandwidth of a BWP may be limited to a certain value), the QCL gap may have a large value.

The start time (e.g., starting slot, OFDM symbol, time sample, subframe, or radio frame) may be determined using any one or more of the following approaches. For example, the QCL gap may start from the last symbol of the CORESET in which the WTRU received a BWP switch command. The QCL gap may start from the slot boundary in which the WTRU received a BWP switch command. The QCL gap may start from the last symbol of the tracking reference signal (TRS) or DL RSs for the QCL measurement transmitted in the target BWP. The QCL gap may be determined based on the time location of the TRS or DL RSs for the QCL measurement transmitted in the target BWP.

The QCL gap may be determined based on numerology of the target BWP or a timer for the QCL measurement of the target BWP. The timer for the QCL gap may be referred to as QCL timer, CSI timer, validity timer, or QCL validity timer. A QCL timer may be used to determine if the QCL parameters measured are still valid or not. If the QCL parameters measured for a target BWP are still valid, no QCL gap may be needed. Otherwise, a WTRU may need to measure QCL parameters before the WTRU starts monitoring PDCCH. A QCL timer length may be configured, determined, or used per WTRU. For example, a WTRU may indicate a capability and required QCL timer length. During the QCL gap, a WTRU may skip monitoring CORESETs configured in the target BWP.

Figure 8:
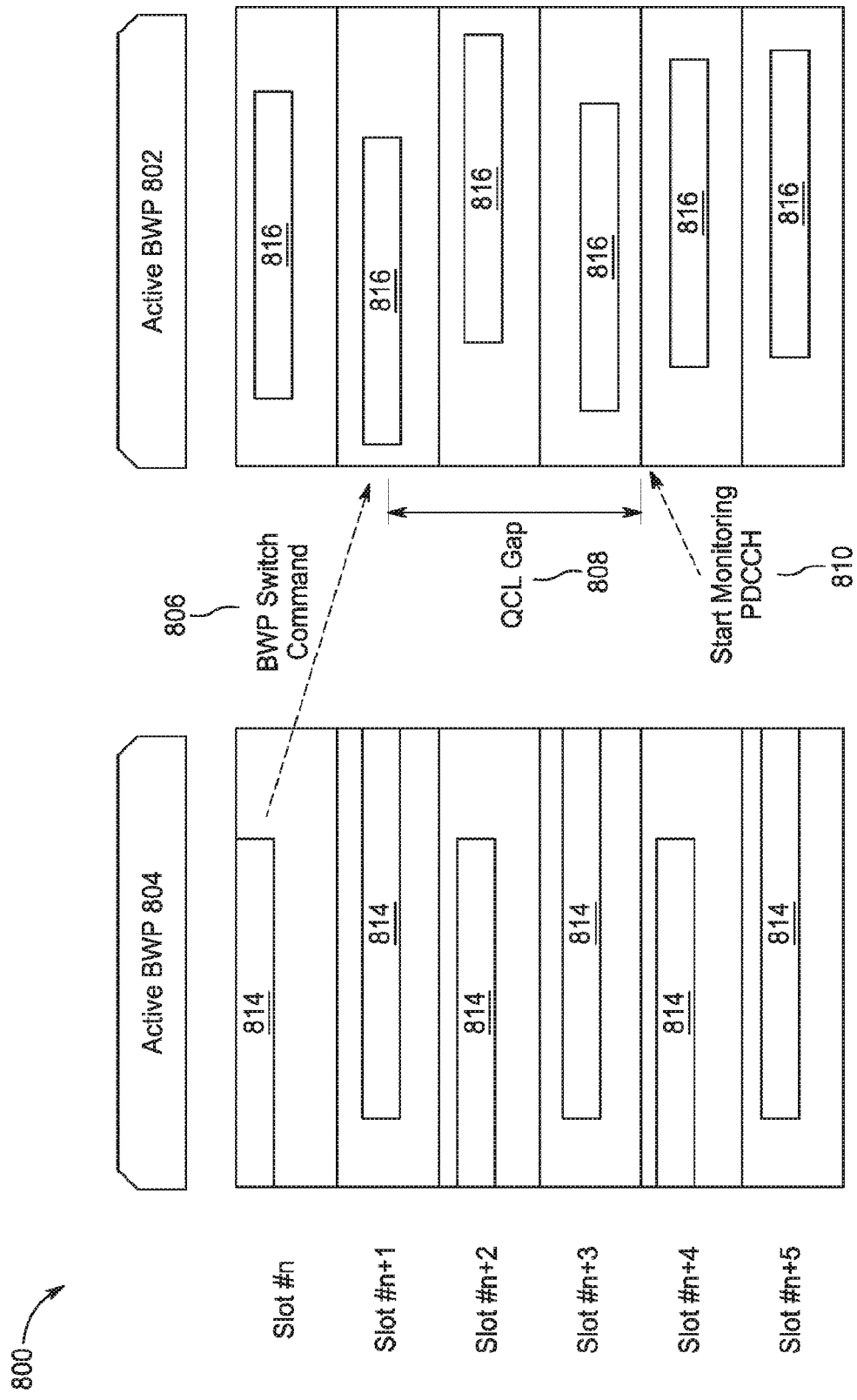
FIG. 8 is a resource diagram of an example BWP switch procedure including a quasi co-location (QCL) gap.

FIG. 8 is a resource diagram of an example BWP switch procedure 800 including a QCL gap 808. In the example of FIG. 8, an active BWP 804 and a (non-active) target BWP 802 may be associated with a WTRU. The active BWP 804 may include CORESETS 814 and the target BWP may include CORESETs 816. The WTRU may receive BWP switch command 806 (e.g., from the network) to switch from active BWP 804 to target BWP 802, which may trigger the start of a QCL gap 808 used in the target BWP 802. The duration (length) of the QCL gap 808 may be a function of a QCL timer and/or numerology of the target BWP 802 and/or the active BWP 804. A WTRU may skip receiving a PDSCH scheduled in the target BWP 802 if the scheduling offset of the PDSCH is less than the QCL gap 808 length. The WTRU may skip monitoring PDCCH during the QCL gap 808 in the target BWP 802, and may start monitoring PDCCH 810 at the end of the QCL 808 as part of the BWP switch procedure 800.

DL RS(s) for the TCI state configured, indicated, or used for a CORESET may be transmitted in a different BWP. For example, a CORESET may be monitored in a first BWP (e.g., an active BWP) and its associated DL RS(s) for QCL measurement (e.g., or a subset of Doppler shift, Doppler spread, average delay, delay spread, and/or spatial RX parameters) may be transmitted or measured in a second BWP (e.g., a non-active BWP). A QCL timer may be used per CORESET when a CORESET is configured with a TCI state that associated with DL RSs in a different BWP (e.g., non-active BWP). The QCL timer may start (or reset) when a measurement of QCL parameters for the CORESET is updated. When the QCL timer is expired, the WTRU may not monitor the CORESET until its QCL parameter measurement is updated.

A measurement gap may be used to update the measurement of QCL parameters when the QCL timer is expired. The measurement gap may be used when all QCL timers of the configured CORESETs in a BWP are expired. At least one of configured CORESETs may be configured with a TCI state that may be associated with DL RSs in the active BWP (e.g., default CORESET). When a QCL timer for one of CORESETs is expired, the CORESET TCI state may be updated to the TCI state used for a default CORESET.

The DL RS(s) for the TCI state configured for a CORESET may be transmitted in a different BWP and a WTRU may not be able to monitor the CORESET and measure the associated DL RS(s) at the same time. A RLM measurement or beam failure detection may be based on the measurement quality of the DL RS(s) associated with the configured CORESET. Any of the following RLM measurement and/or beam failure detection procedures may be applied when DL RS(s) for the TCI states configured for one or more configured CORESETs are transmitted in different BWPs.

In an example procedure, a WTRU may perform RLM (and/or beam failure detection) in a default BWP, where the default BWP may include DL RS(s) associated with one or more CORESETs configured in the carrier. For example, RLM measurement may be based on the DL RS(s) associated with one or more CORESETs configured in a default BWP. Out-of-sync status may be determined based on the measurement of DL RS(s) associated with one or more CORESETs in a default BWP. Out-of-sync status may be determined when the quality of all CORESETs configured in a carrier is below a threshold. A beam failure instance may be determined (and indicated from PHY layer to MAC layer) when the quality of all CORESETs configured in a carrier is below a threshold. The beam failure instance may be determined when the quality of CORESETs in a default BWP is below a threshold.

In another example procedure, a spatial QCL association may be configured between DL RSs in a default BWP and DL RSs in another BWP, as shown in Table 4, such that the reference RS may be DL RSs in a default BWP and the target RS may be DL RS in a BWP (other than the default BWP). When a WTRU is active in a BWP that is not a default BWP, the WTRU may measure reference RSs (e.g., DL RSs in default BWP which may be spatial QCL-ed with DL-RSs in an active BWP) for RLM and/or beam failure detection. A WTRU may measure DL RSs in active BWPs that may be QCL-ed with DL RSs for all configured CORESETs in a carrier for RLM and/or beam failure detection.

TABLE 4

Example of QCL association between RS in different BWPs

| QCL parameter | Reference RS (BWP_0; default) | Target RS (BWP_1) | CORESETs |
|---|---|---|---|
| Spatial | SSB #1 | CSI-RS #1 | CORESET #0 (BWP_0) |
| Spatial | SSB #2 | CSI-RS #2 | CORESET #1 (BWP_0) |
| Spatial | SSB #3 | CSI-RS #3 | — |
| Spatial | SSB #4 | CSI-RS #4 | — |
| Spatial | SSB #5 | CSI-RS #5 | CORESET #0 (BWP_1) |
| Spatial | SSB #6 | CSI-RS #6 | CORESET #1 (BWP_1) |

In another example procedure, spatially QCL-ed DL-RSs may be used across BWPs and a WTRU may use a QCL measurement of a DL-RS in an active BWP for a target BWP if the DL-RS in a target BWP is QCL-ed with the DL-RS in an active BWP. A group of QCL-ed DL RSs across BWPs may be referred to as a BWP-common beam group. Table 5 shows an example of a BWP-common beam group where DL RSs within the same BWP-common beam group may be QCL-ed with respect to a spatial QCL parameter. A WTRU may assume that any of DL RSs within a BWP-common beam group may be used for QCL parameter measurement. For example, when a WTRU switches from an active BWP (e.g., BWP_1) to a default BWP, the QCL parameter measurement from CSI-RS #1 in BWP_1 may be used for SSB #1 in default BWP.

TABLE 5

An example of BWP-common beam group

| QCL parameter | Reference RS (BWP_0; default) | Target RS (BWP_1) | BWP-common beam group |
|---|---|---|---|
| Type A | SSB #1 | CSI-RS #1 | Group #1 |
| Type A | SSB #2 | CSI-RS #2 | Group #2 |
| Type A | SSB #3 | CSI-RS #3 | Group #3 |
| Type A | SSB #4 | CSI-RS #4 | Group #4 |
| Type A | SSB #5 | CSI-RS #5 | Group #5 |
| Type A | SSB #6 | CSI-RS #6 | Group #6 |

A PDSCH may be associated with multiple BWPs. For a beam indication of a PDSCH, one or more TCI states may be used. For example, M TCI states may be configured via higher layer signaling (e.g., RRC), where each TCI state may be associated with DL RSs. An N bit TCI field in a DCI may be used to dynamically indicate a TCI state for a PDSCH transmission. If $M>2^N$, the $2^N$ TCI states out of M TCI states may be selected via another higher layer signaling (e.g., MAC-CE).

One or more BWPs may be configured for a WTRU and TCI states for each BWP may be configured. For example, M TCI states and associated DL RSs may be configured via higher layer signaling (e.g., RRC) and commonly used across BWPs in a carrier. The M TCI states may be configured per carrier. Each BWP may have an N bit TCI field in a DCI, wherein the value of N may be determined based on the BWP index. A subset of M TCI states may be selected or determined when $M>2^N$ for a BWP and the subset may be determined per BWP. For example, the subset may be different across BWPs. A separate MAC-CE per BWP may be used to select a subset of M TCI states. The subset of M TCI states may be the TCI states associated with DL RSs transmitted in the same BWP. The M TCI states and associated DL RSs may be configured via higher layer signaling per BWP, such that the associated DL RSs may be transmitted, or signaled in the same BWP. The associated DL RS may be transmitted, or signaled in any BWP within the same carrier.

A WTRU may be indicated to switch a BWP from an active BWP to another configured BWP. For example, a BWP indicator field (e.g., 1 or 2 bits) may be used to indicate the corresponding BWP for a PDSCH transmission (or a PUSCH transmission) or the BWP indicator field may be used to indicate the BWP switch for a PDCCH monitoring. A TCI state may be used to indicate corresponding BWP for a PDSCH transmission. For example, DL RSs for a TCI state may be transmitted in a BWP and if a TCI state is indicated, the corresponding BWP may be determined to be the BWP containing DL RSs associated with the TCI states. When a TCI state is used for a BWP switch, the BWP indication field may not be present in the DCI. When a TCI state is used for a BWP switch, the BWP indication field may be used. Table 6 shows an example of BWP indication based on TCI state.

If a TCI bit field present is activated in a DCI, the BWP indication field may not be present. Otherwise, the BWP indication field may be present in the DCI.

TABLE 6

Example of BWP indication using a TCI states

| TCI states | DL RS (associated BWP index) | BWP index for PDSCH reception |
|---|---|---|
| 0 | SSB #1 (#0) | #0 |
| 1 | SSB #2 (#0) | #0 |
| 2 | CSI-RS #1 (#1) | #1 |
| 3 | CSI-RS #2 (#1) | #1 |
| ... | ... | ... |
| $2^N - 1$ | CSI-RS #K (#2) | #2 |

In an example, a WTRU may be indicated to switch a BWP for a PDSCH reception from a current BWP (e.g., active BWP). The WTRU may receive the PDSCH in the indicated BWP (e.g., target BWP) if the scheduling offset for the PDSCH is greater than a threshold K, where the value of K may be determined based on any one or more of the following criteria: a time length that a WTRU may be active in the active BWP; numerology of the active BWP and/or the target BWP; a time location of measurement reference signal (e.g., TRS) in a target BWP; a bandwidth of the target BWP; and/or a WTRU capability. For example, if the time length that the WTRU may be active in the current active BWP is longer than a threshold, a first K value may be used. Otherwise, a second K value may be used, where the first K value may be larger than the second K value. If the numerology (e.g., SCS) is the same for active BWP and target BWP, a first K value may be used. If the numerology is different (e.g., SCS of active BWP is larger that of target BWP), a second K value may be used. If a measurement reference signal is located at the beginning of the switching time, a first K value may be used. Otherwise, a second K value may be used. In another example, the K value may be determined with a time offset, where the time offset may be function of the measurement reference signal time location.

In an example, if the scheduling offset for the PDSCH is less than the threshold K, the WTRU may receive the PDSCH in the current BWP. In an example, a WTRU may receive a scheduled PDSCH with BWP switch command in the current BWP (e.g., active BWP) if the scheduling offset is less than a first threshold (e.g., K1) in a first frequency range (FR1). The WTRU may also receive a scheduled PDSCH with BWP switch command in the current BWP if the scheduling offset is less than a second threshold (e.g., K2) in a second frequency range (FR2). The first frequency range may be the carrier frequency below 6 GHz. The second frequency range may be the carrier frequency above 6 GHz. The first threshold K1 and the second threshold K2 may be different. One or more threshold values may be used to determine the BWP location for the PDSCH reception based on the scheduling offset, such that the first threshold value may be used for a first frequency range and the second threshold value may be used for a second frequency range.

Default QCL assumption may be used with multiple BWPs. One or more CORESETs may be configured per BWP, such that each CORESET may be associated with a downlink beam (a DL signal). Each CORESET may be configured with a CORESET identity (ID) and each CORESET ID may be a unique number within a carrier or a BWP. For example, Nc CORESETs may be configured for a carrier with CORESET IDs {0, 1, 2, 3, 4, . . . , Nc-1}, where CORESETs {0, 1} may be located in a first BWP, CORE-SETs {2, 3} may be located in a second BWP, and the rest of CORESETs may be located in a third BWP.

In an example, a PDSCH may be scheduled with a scheduling offset by a PDCCH (and/or DCI), such that the scheduling offset may be indicated or determined by the associated PDCCH (and/or DCI). For example, the scheduling offset may be any one or more of timing offset, slot offset, subframe offset, symbol offset, subcarrier offset, RB offset, and/or BWP offset. If the scheduling offset is less than a threshold K, a WTRU may assume, use, or determine one or more QCL parameters (e.g., spatial Rx parameters) based on a predefined CORESET. Otherwise, the WTRU may determine one or more QCL parameters based on a DL RS indicated in the associated PDCCH (and/or DCI). For example, the predefined CORESET may be a default CORESET within an active BWP.

If a scheduled PDSCH and its associated PDCCH are in the same BWP and the scheduling offset is less than a threshold K, the CORESET with the lowest CORESET ID in the BWP may be used or determined as a default CORESET (or the predefined CORESET). The lowest CORESET ID may be with the lowest number except for '0'. The lowest CORESET ID may be with the lowest number including '0'. If a scheduled PDSCH and its associated PDCCH are in the same BWP and the scheduling offset is greater than the threshold K, a WTRU may assume, use, or determine one or more QCL parameters from the indicated DL RS. In an example, irrespective of the BWP location for PDSCH and/or PDCCH reception, the default CORESET may be determined based on the lowest CORESET ID within a carrier when the scheduling offset is less than a threshold K. For example, the lowest CORESET ID may be the lowest ID number within all CORESETs configured in the carrier.

A PDSCH may be scheduled with a scheduling offset and a BWP switch command via an associated PDCCH (and/or DCI). When the scheduling offset is less than a threshold K, a WTRU may assume, use, or determine one or more QCL parameters (e.g., spatial Rx parameters) based on a default CORESET, such that the default CORESET may be at any one or more of the following resource: the CORESET with the lowest CORESET ID in the BWP, such that the WTRU may receive the associated PDCCH (and/or DCI); the CORESET with the lowest CORESET ID in the BWP, such that the WTRU may receive the scheduled PDSCH; the CORESET with the lowest CORESET ID across all BWPs within the carrier wherein the WTRU may receive PDCCH and/or PDSCH; the CORESET with the lowest CORESET ID in the default BWP; and/or the CORESET in which the WTRU may monitor or receive the PDCCH.

When the scheduling offset is less than a threshold K, one or more threshold values may be used. For example, a first threshold value may be used when the PDSCH and its associated PDCCH are located in the same BWP and a second threshold value may be used when the PDSCH and its associated PDCCH are located in different BWPs. The first threshold value may be greater than the second threshold value.

When the scheduling offset is less than a threshold K, one or more default CORESETs may be used. For example, a first default CORESET may be used when scheduling offset is less than a threshold and the BWPs for PDSCH and its associated PDCCH are the same. A second default CORESET may be used when scheduling offset is less than a threshold and the BWPs for PDSCH and its associated PDCCH are different. The first default CORESET may be the CORESET with the lowest CORESET ID in the BWP, such that a WTRU may receive the scheduled PDSCH. The first default CORESET may be the CORESET with the lowest CORESET ID across all BWPs in a carrier. The second default CORESET may be the CORESET with the lowest CORESET ID across all BWPs in a carrier. The second default CORESET may be the CORESET with the lowest CORESET ID in the BWP wherein a WTRU may receive the PDCCH. The second default CORESET may be the CORESET with the lowest CORESET ID in the BWP where the WTRU may receive the scheduled PDSCH.

Figure 9:
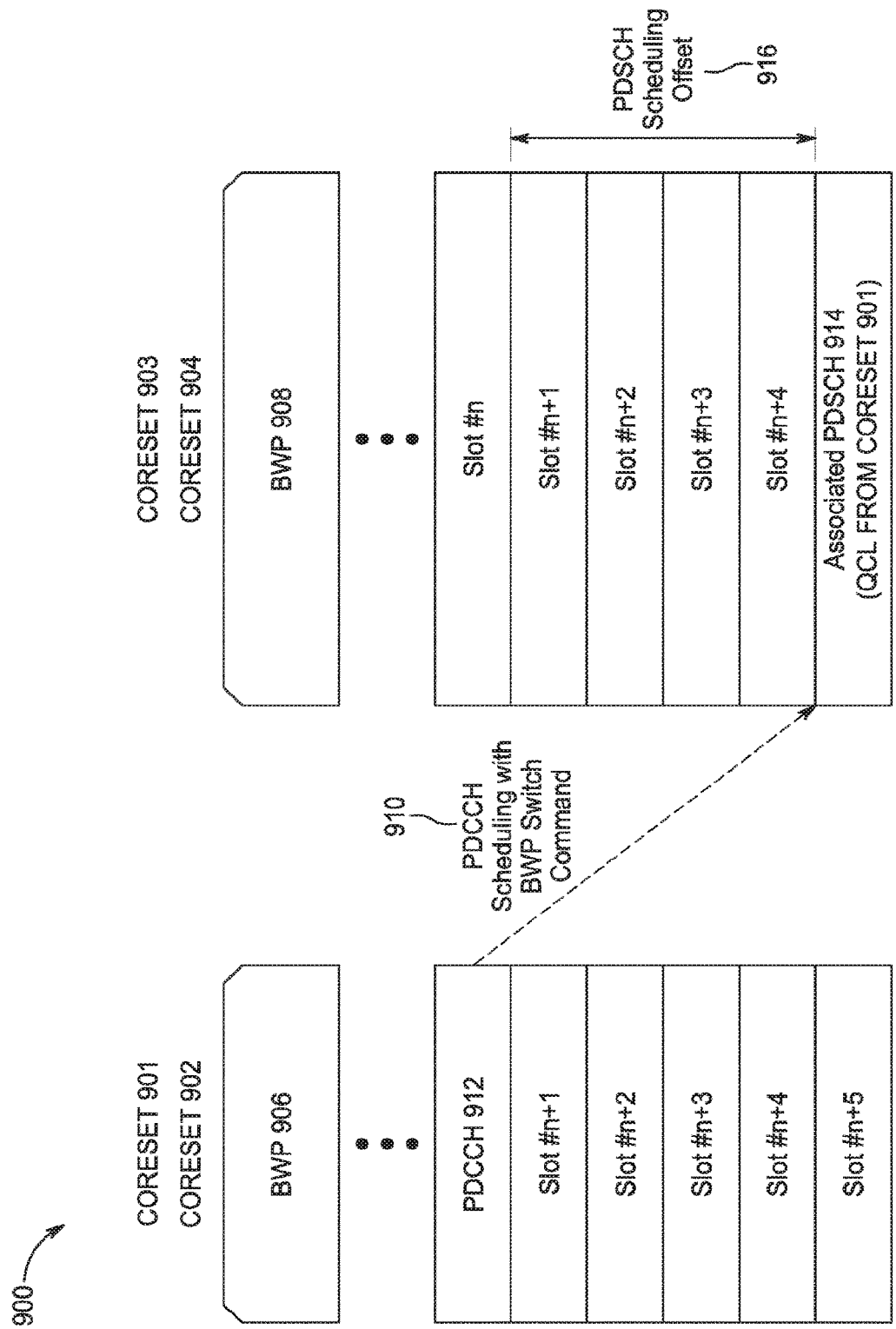
FIG. 9 is a resource diagram of an example CORESET allocation 900 including a default control resource set CORESET for physical downlink shared channel (PDSCH) reception.

FIG. 9 is a resource diagram of an example CORESET allocation 900 including a default CORESET 901 for PDSCH reception. In the example of FIG. 9, BWPs 906 and 908 are associated with a WTRU. BWP 906 may include CORESETs 901 and 902, and BWP 908 may include CORESETs 903 and 904. PDCCH 912 received by the WTRU on BWP 906 may include PDSCH scheduling and/or PDSCH scheduling may be included in a BWP switch command 910 to switch the WTRU from BWP 906 to BWP 908. The WTRU may receive an associated PDSCH 914 in BWP 908, after a PDSCH scheduling offset 916, such that the PDSCH 914 may be QCL-ed from CORESET 901 on BWP 906.

When the scheduling offset is less than a threshold K, a default CORESET may be determined, configured, or used in each BWP. A WTRU may assume, determine, or use a first subset of QCL parameters for the scheduled PDSCH reception from a first default CORESET that may be in the current BWP (e.g., a BWP for PDCCH) and a second subset of QCL parameters for the scheduled PDSCH reception from a second default CORESET which may be in the target BWP (e.g., a BWP for the scheduled PDSCH). The first default CORESET may be a CORESET with lowest CORESET ID in the active BWP. The first default CORESET may be the CORESET in which a WTRU may receive the PDCCH (and/or DCI). The second default CORESET may be a CORESET with lowest CORESET ID in the target BWP.

When the scheduling offset is less than a threshold K, a default CORESET may be determined within the CORESETs associated with a BWP, and the WTRU may receive the scheduled PDSCH. The CORESETs associated with a BWP may be determined based on the TCI state configured for the CORESETs. For example, a CORESET configured in a first BWP may be part of CORESETs associated with a second BWP if the CORESET in the first BWP is configured with a TCI state associated with the second BWP. A TCI state may be associated with one or more BWPs. A DL RS which may be transmitted within a first BWP may be associated with another BWP, which may be non-overlapped with the first BWP in frequency domain. A default CORESET may be the CORESET with a lowest CORESET ID within the CORESETs associated with the BWP. A TCI state may be associated with one or more carriers. A DL RS, which may be transmitted within a first BWP in a first carrier, may be associated with another BWP in different carrier. If one or more CORESETs have the same lowest CORESET ID in different carriers, the CORESET in a Pcell may be the default CORESET. If one or more CORESETs have the same lowest CORESET ID in different carriers, the CORESET in a carrier with the lowest carrier index may be the default CORESET. When the scheduling offset is less than a threshold K, a default TCI may be used, and the default TCI state may be the lowest TCI state number within TCI states associated with a BWP. The BWP may be a target BWP in which a WTRU may receive the scheduled PDSCH. The BWP may be an active BWP in which the WTRU may monitor and/or receive PDCCH.

Figure 10:
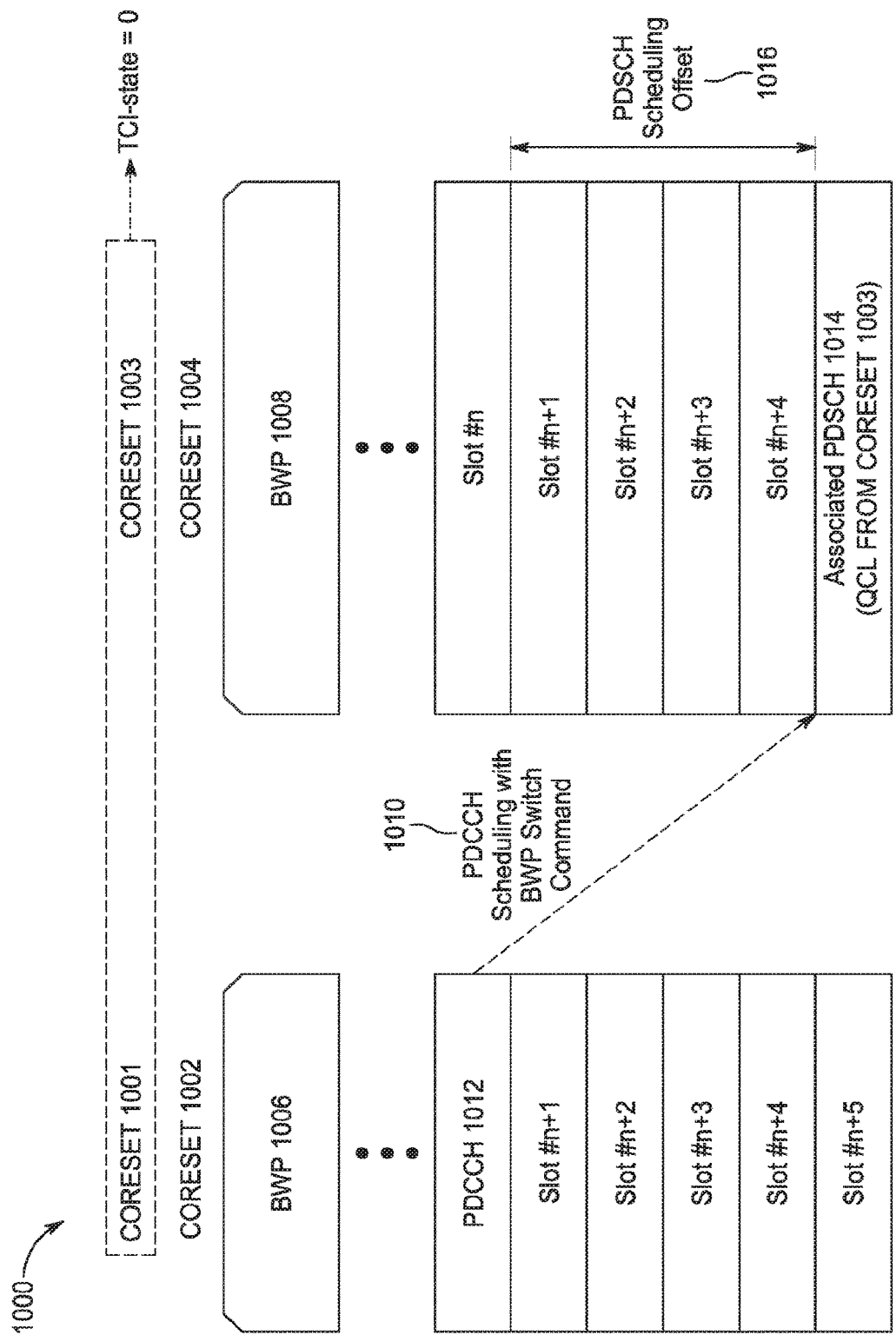
FIG. 10 is a resource diagram of an example CORESET allocation including an example usage of same transmission configuration indication (TCI) states for CORESETs with the lowest CORESET ID in each BWP.

FIG. 10 is a resource diagram of an example CORESET allocation 1000 including an example usage of same TCI states for CORESETs with the lowest CORESET ID in each BWP 1006 and 1008 for default CORESET. In the example of FIG. 10, BWPs 1006 and 1008 are associated with a WTRU. BWP 1006 may include CORESETs 1001 and 1002 (CORESET 1001 having the lowest CORESET ID in BWP 1006), and BWP 1008 may include CORESETs 1003 and 1004 (CORESET 1003 having the lowest CORESET ID in BWP 1008). PDCCH 1012 received by the WTRU on BWP 1006 may include PDSCH scheduling and/or PDSCH scheduling may be included in a BWP switch command 1010 to switch the WTRU from BWP 1006 to BWP 1008. The WTRU may receive an associated PDSCH 1014 in BWP 1008, after a PDSCH scheduling offset 1016, such that the PDSCH 1014 may be QCL-ed from CORESET 1003 on BWP 1008. The CORESETs 1001 and 1003 with the lowest CORESET ID in each respective BWP 1006 and 1008 in a carrier may be associated with the same TCI state (e.g., TCI state=0), or same DL RS.

In an example, the default CORESET may be changed based on the BWP in which a WTRU may receive the scheduled PDSCH; however, one or more QCL parameters (e.g., spatial Rx parameters) may be unchanged irrespective of the BWP location for the PDSCH reception. When CORESETs with a lowest CORESET ID in each BWP are not associated with the same TCI state, the default CORESET for PDSCH reception may be based on the CORESET with the lowest CORESET ID in the BWP in which the WTRU may receive PDCCH. When CORESETs with a lowest CORESET ID in each BWP are associated with the same TCI state, the default CORESET for PDSCH reception may be based on the CORESET with the lowest CORESET ID in the BWP in which a WTRU may receive PDSCH. In an example, the lowest CORESET ID may be replaced by the highest CORESET ID, a higher layer configured CORESET ID, indicated CORESET ID, and/or a fixed CORESET ID.

Link reconfiguration may occur when multiple BWPs are configured. While a WTRU is in connected mode into a BWP, it may monitor the integrity of its radio link. For example, the WTRU may perform RLM by measuring the quality of the CSI-RS and/or SSB (e.g., collectively named RLM-RS pilot signals). The CSI-RS may be a WTRU-dedicated configured RS, while SSB may be present in a default BWP. When the SSB are to be used for RLM evaluation, a particular offset may be signaled by a network in order to have a scaling equivalence between SSB and CSI-RS measurements. During the RLM evaluation periods, the WTRU physical layer is supposed to deliver to the upper layers the in-sync and out-of-sync messages after each Tevaluation period (e.g., Tevaluation may be a higher layer parameter). For the in-sync messages, any good measurement may be considered sufficient (SSB or CSI-RS). For the out-of-sync message, the WTRU may perform evaluations on all configured RLM-SS before declaring a RLF.

Upon a new BWP activation, a WTRU may have a new BWP with no SSB present. In this case, the WTRU may rely on new CSI-RS for RLM-SS resources. In an example, the WTRU may have a frequency selective fading problem in a newly activated BWP, and thus the WTRU may go out-of-sync in the following few Tevaluation periods if the WTRU may rely on the CSI-RS (e.g., due to the lack of configured BWP measurements outside of the active BWP). In order to assess correctly if the out-of-sync situation in the newly activated BWP is a loss of cell coverage or frequency selective fading in the new BWP, the WTRU may measure the default BWP again, or its previous active BWP, before declaring RLF.

Upon a new BWP activation, the WTRU may store the old BWP configuration and parameters, while a network (NW) may keep all configured WTRU measurement RSs (e.g., CSI-RS) until at least one of the following measurements or actions confirm the integrity of the new BWP radio link. For example, a first CSI feedback may confirm the quality of the channel that is fedback to the network. A first RLM-SS evaluation period may show in-sync RLM quality and/or IN-SYNC indication may be delivered to the WTRU upper layers. The DCI grant or scheduled data may be received correctly and the WTRU may send an ACK in the new BWP. An RSRP measurement may be performed and may show a viable (e.g., over a threshold) link. A first beam measurement evaluation may be performed and the serving beam may be over the network indicated threshold.

If any of the above measurements or actions is not fulfilled, the WTRU may perform a fallback measurement procedure in the previous configured BWP and perform a CSI-RS measurement. In case of a successful CSI-RS fallback measurement on the stored (previously active) BWP, the WTRU may start a random access channel (RACH) procedure with a BWP part activation failure indication cause on the previous BWP. In case of a failed CSI-RS fallback measurement, which indicates that the stored BWP is not viable, the WTRU may perform a beam failure recovery procedure on the new BWP. If this beam recovery fails, the WTRU may declare RLF and follow an RLF procedure.

Beam failure and recovery are described herein. A beam failure instance may be determined based on one or more of following situations. First, when a measurement quality of DL RSs associated with all or subset of CORESETs configured in an active BWP is below a threshold, the beam instance may be determined as failure. Second, when a measurement quality of DL RSs associated with all or subset of CORESETs configured for a carrier is below a threshold, the beam instance may be determined as failure. Third, when a measurement quality of DL RSs configured for beam failure detection is below a threshold, the beam instance may be determined as failure. Here, the measurement quality for DL RSs transmitted in an active BWP may be measured. Alternatively or additionally, all DL RSs configured for beam failure detection may be measured for beam failure detection. Lastly, the measurement quality may be hypothetical BLER of the configured CORESETs or L1-RSRP of the DL RSs associated with all or subset of CORESETs configured.

In an embodiment, if a WTRU detected a beam failure instance (e.g., measurement of DL RSs associated with CORESETs in an active BWP) or beam failure instances in an active BWP, the WTRU may switch to a default BWP. For example, a WTRU may switch to a default BWP without a BWP switch command (e.g., BWP indication) or inactivity timer expiration when the WTRU detected a beam failure instance in an active BWP. A maximum number of beam failure instances may be used for a WTRU to switch to a default BWP. A WTRU may stay in an active BWP if the maximum number of beam failure instance is not reached. The maximum number of beam failure instance may be determined based on the inactivity timer length. A WTRU may keep counting the beam failure instance irrespective of the BWP switch. A WTRU may reset the beam failure instance counter (and/or beam failure recovery timer) when it switched to a new BWP. The beam failure instance may be counted when a measurement quality for DL RSs associated with the CORESETs in a default BWP. Alternatively or additionally, whether the WTRU may reset or continue beam failure instance counter (and/or beam failure recovery timer) after switching BWP may be determined based on the beam failure detection RS configured for the CORESETs. For example, if the same set of beam failure detection RS is configured for the CORESETs in the active BWP and the CORESETs in the default BWP, the WTRU may continue beam failure instance counter (and/or beam failure recovery timer) after switching BWP from active BWP to default BWP; otherwise, the WTRU may reset the beam failure instance counter (and/or beam failure recovery timer).

In an example, a WTRU may be configured with control resource set-beam failure recovery (CORESET-BFR) which may be used for a base station (e.g., a gNB) response corresponding to a beam recovery trial, wherein the beam recovery trial may be based on a sending an uplink signal to indicate a new candidate beam. The new candidate beam may be indicated by transmitting an uplink signal (e.g., PUCCH or PRACH) associated with the new candidate beam. The new candidate beam may be measured, monitored, or detected based on one or more downlink reference signals, beam reference signals, SS blocks, and/or the like.

A CORESET-BFR may be configured in a default BWP, therefore a WTRU may start monitoring CORESET-BFR in a default BWP after sending beam recovery trial irrespective of the current active BWP. For example, if a WTRU detected beam failure in an active BWP and sent a beam recovery trial, the WTRU may switch to the default BWP and monitor CORESET-BFR in the default BWP.

In an example, a WTRU may ignore inactivity timer for BWP when the WTRU detected beam failure (e.g., declared beam failure) or the WTRU is in beam failure recovery procedure. For example, if a WTRU declared beam failure and started beam failure recovery procedure (e.g., sending beam recovery trial, monitoring gNB response, and/or monitoring CORESET-BFR), the WTRU may stay in the current active BWP even after the inactivity timer is expired until the beam failure recovery procedure is finished. Alternatively or additionally, the inactivity timer may be extended when beam failure is declared in the active BWP; the inactivity timer may be reset when a beam failure is declared; or the inactivity timer may be reset when one or more beam failure instances are detected.

In another example, a CORESET-BFR may be configured in a certain BWP and a WTRU may switch to the BWP containing CORESET-BFR when the WTRU detected one or more beam failure instances. If multiple BWPs contain CORESET-BFR, a WTRU may switch to a BWP containing CORESET-BFR with the lowest CORESET ID among the CORSET-BFRs.

In another example, when a WTRU detected or determined one or more beam failure instances in an active BWP, the WTRU may perform beam failure recovery procedures (e.g., sending beam recovery trial and/or monitoring CORESET-BFR). The WTRU may start beam failure detection when the WTRU switched to a default BWP due to inactive timer expiration even though the WTRU was in beam recovery procedure in the active BWP.

Beam recovery counter/timer with multiple BWPs is described herein. A beam recovery counter may be used in combination with any of other embodiments described herein. If the number of beam recovery trial is greater than a threshold, a WTRU may stop trying beam recovery trial. The beam recovery trial may be referred to as the WTRU's transmission of a contention-free RACH (CFRA) resource or a contention-based RACH (CBRA) resource associated with a downlink beam reference signal. A downlink beam reference signal may be a SS block or a CSI-RS. The counter may be started after beam failure is declared, wherein the beam failure is declared when beam failure instances are detected N consecutive times. The counter may stop (or reset) when beam failure instance is not detected M consecutive times or beam failure instance does not occur during a time window. The counter may stop (or reset) when uplink BWP for CFRA or CBRA resource transmission is switched. The counter may continue irrespective of the uplink BWP switch for beam recovery trial (e.g., CFRA or CBRA transmission for beam recovery)

In an example, the beam recovery counter may be used for contention-free random access (CFRA) resource and contention-based random access (CBRA) resource separately. For example, a first counter may be used for CFRA resource and a second counter may be used for CBRA resource, wherein a threshold (e.g., maximum allowed beam recovery trial) may be configured, determined, or used separately for CFRA resource and CBRA resource. If a first counter is larger than a first threshold (e.g., the number of trial for CFRA resource for beam recovery reached the maximum allowed trials based on CFRA resource), a WTRU may stop using CFRA resource for beam recovery. If a second counter is larger than a second threshold (e.g., the number of trial for CBRA resource for beam recovery reached the maximum allowed trials based on CBRA resource), a WTRU may stop using CBRA resource for beam recovery. The first threshold and the second threshold may be configured individually. The first threshold may be determined as a function of the second threshold. For example, the first threshold may be a half of the second threshold. A total maximum allowed beam recovery trial including both CFRA and CBRA may be configured and the first threshold may be determined as a function of the total maximum allowed beam recovery trial.

In another example, a single total maximum allowed beam recovery trial number may be used for both CFRA and CBRA based beam recovery trial. A WTRU may need to switch to CBRA resource based beam recovery trial if the WTRU fails to recover the beam failure after K1 consecutive CFRA beam recovery trials. One or more of following may apply. First, K1 may be configured via a higher layer signaling. Second, K1 consecutive CFRA beam recovery trials may be based on the CFRA resources associated with a beam RS of which RSRP may be higher than a threshold. For example, one or more candidate beams associated with CFRA resources may be determined based on the RSRP of the beam RSs with a first threshold (e.g., if RSRP of a beam RS is higher than a first threshold, the beam RS may be considered as a candidate beam). If one or more candidate beams have RSRP higher than a second threshold, it may be counted as K1 consecutive CFRA beam recovery trial if the candidate beam having RSRP higher than a second threshold is used for the beam recovery trial. The second threshold may be higher than the first threshold. Third, a WTRU may use or be allowed to use CFRA resource for a beam recovery trial again after K2 consecutive CBRA beam recovery trial.

A beam recovery timer may be used in combination with any of other embodiments described herein. If the timer expires, a WTRU may stop beam recovery trial. The timer may start when beam failure is declared and reset when beam failure instance is not detected M consecutive times or beam failure instance does not occur during a time window.

In an example, when a beam recovery timer may be expired, a WTRU may stop using CFRA resource or CBRA resource for beam failure recovery. When a beam recovery timer may be expired, the WTRU may stop using CFRA resource and use CBRA resource if the beam recovery counter is not reached the maximum allowed number of beam recovery trials. When a beam recovery timer may be expired, the WTRU may stop using CFRA resource if one or more of candidate beam RSRP associated with the CFRA resource is higher than a second threshold. The WTRU may stop using CFRA resource after beam recovery timer is expired when candidate beam RSRP is higher than the second threshold; otherwise, the WTRU may use CFRA resource after beam recovery timer is expired.

In another example, a beam recovery timer may be reset (e.g., reset to '0') when the uplink BWP is switched for beam recovery trial. For example, when an uplink BWP is switched due to inactivity timer is expired, the beam recovery timer may be reset.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed is:

1. A method performed by a wireless transmit/receive unit (WTRU), the method comprising:
   receiving a physical downlink control channel (PDCCH) transmission on a first bandwidth part (BWP) associated with a first carrier, wherein the PDCCH transmission includes scheduling information for receiving a physical downlink shared channel (PDSCH) transmission via a second BWP associated with a second carrier;
   determining one or more quasi co-located (QCL) parameters for the PDSCH transmission using a lowest transmission configuration indication (TCI) state associated with the second BWP associated with the second carrier based on a scheduling offset of the PDSCH transmission being less than a threshold and based on the PDSCH transmission being received via the second BWP associated with the second carrier; and
   receiving the PDSCH transmission using the determined one or more QCL parameters.

2. The method of claim 1, wherein the threshold is determined based on at least one of:
   a subcarrier spacing of the first BWP associated with the first carrier or a subcarrier spacing of the second BWP associated with the second carrier.

3. The method of claim 2, wherein the threshold is determined based on both the subcarrier spacing of the first BWP associated with the first carrier and the subcarrier spacing of the second BWP associated with the second carrier.

4. The method of claim 3, wherein the threshold has a first value when the subcarrier spacing of the first BWP associated with the first carrier is the same as the subcarrier spacing of the second BWP associated with the second carrier, and the threshold has a second value when the subcarrier spacing of the subcarrier spacing of the first BWP associated with the first carrier is the different than the subcarrier spacing of the second BWP associated with the second carrier.

5. The method of claim 2, wherein the threshold is determined based on the subcarrier spacing of the first BWP associated with the first carrier.

6. The method of claim 1, further comprising:
receiving a second PDCCH transmission on the first BWP associated with the first carrier, wherein the second PDCCH transmission includes scheduling information for receiving a second PDSCH transmission via the first BWP associated with the first carrier;
determining one or more second QCL parameters for the second PDSCH transmission using a control resource set (CORESET) with a lowest CORESET identity (ID) in the first BWP based on a scheduling offset of the second PDSCH transmission being less than the threshold and based on the PDSCH transmission being received via the first BWP associated with the first carrier; and
receiving the second PDSCH transmission using the determined one or more second QCL parameters.

7. The method of claim 1, wherein the PDSCH scheduling offset corresponds to a time between receipt of the PDCCH transmission received via the first BWP associated with the first carrier and the PDSCH transmission received via the second BWP associated with the second carrier.

8. The method of claim 1, wherein the one or more QCL parameters include spatial reception (Rx) parameters.

9. A wireless transmit/receive unit (WTRU) comprising:
a receiver configured to receive a physical downlink control channel (PDCCH) transmission on a first bandwidth part (BWP) associated with a first carrier, wherein the PDCCH transmission includes scheduling information for receiving a physical downlink shared channel (PDSCH) transmission via a second BWP associated with a second carrier; and
a processor configured to determine one or more quasi co-located (QCL) parameters for the PDSCH transmission using a lowest transmission configuration indication (TCI) state associated with the second BWP associated with the second carrier based on a scheduling offset of the PDSCH transmission being less than a threshold and based on the PDSCH transmission being received via the second BWP associated with the second carrier,
wherein the receiver is further configured to receive the PDSCH transmission using the determined one or more QCL parameters.

10. The WTRU of claim 9, wherein the threshold is determined based on at least one of:
a subcarrier spacing of the first BWP associated with the first carrier or a subcarrier spacing of the second BWP associated with the second carrier.

11. The WTRU of claim 10, wherein the threshold is determined based on both the subcarrier spacing of the first BWP associated with the first carrier and the subcarrier spacing of the second BWP associated with the second carrier.

12. The WTRU of claim 11, wherein the threshold has a first value when the subcarrier spacing of the first BWP associated with the first carrier is the same as the subcarrier spacing of the second BWP associated with the second carrier, and the threshold has a second value when the subcarrier spacing of the subcarrier spacing of the first BWP associated with the first carrier is the different than the subcarrier spacing of the second BWP associated with the second carrier.

13. The WTRU of claim 10, wherein the threshold is determined based on the subcarrier spacing of the first BWP associated with the first carrier.

14. The WTRU of claim 10, wherein the receiver is configured to receive a second PDCCH transmission on the first BWP associated with the first carrier, wherein the second PDCCH transmission includes scheduling information for receiving a second PDSCH transmission via the first BWP associated with the first carrier,
wherein the processor is configured to determine one or more second QCL parameters for the second PDSCH transmission using a control resource set (CORESET) with a lowest CORESET identity (ID) in the first BWP based on a scheduling offset of the second PDSCH transmission being less than the threshold and based on the PDSCH transmission being received via the first BWP associated with the first carrier, and
wherein the receiver is configured to receive the second PDSCH transmission using the determined one or more second QCL parameters.

15. The WTRU of claim 10, wherein the PDSCH scheduling offset corresponds to a time between receipt of the PDCCH transmission received via the first BWP associated with the first carrier and the PDSCH transmission received via the second BWP associated with the second carrier.

16. The WTRU of claim 10, wherein the one or more QCL parameters include spatial reception (Rx) parameters.

17. A base station comprising:
a transmitter configured to send a physical downlink control channel (PDCCH) transmission to a first bandwidth part (BWP) associated with a first carrier, wherein the PDCCH transmission includes scheduling information for sending a physical downlink shared channel (PDSCH) transmission to a second BWP associated with a second carrier; and
a processor configured to associate a lowest transmission configuration indication (TCI) state with the second BWP associated with the second carrier based on a scheduling offset of the PDSCH transmission being less than a threshold and based on the PDSCH transmission to be sent to the second BWP associated with the second carrier,
wherein the transmitter is further configured to send the PDSCH transmission.

18. The base station of claim 17, wherein the transmitter is configured to send a second PDCCH transmission to the first BWP associated with the first carrier, wherein the second PDCCH transmission includes scheduling information for sending a second PDSCH transmission to the first BWP associated with the first carrier,
wherein the processor is configured to associate a control resource set (CORESET) with a lowest CORESET identity (ID) with the first BWP based on a scheduling offset of the second PDSCH transmission being less than the threshold and based on the PDSCH transmission to be sent to the first BWP associated with the first carrier, and
wherein the transmitter is configured to send the second PDSCH transmission.

* * * * *